(12) United States Patent
Tamura

(10) Patent No.: US 7,460,108 B2
(45) Date of Patent: Dec. 2, 2008

(54) PORTABLE INFORMATION TERMINAL DEVICE

(75) Inventor: Sou Tamura, Takatsuki (JP)

(73) Assignee: Panasonic Corporation, Osaka (JP)

( * ) Notice: Subject to any disclaimer, the term of this patent is extended or adjusted under 35 U.S.C. 154(b) by 754 days.

(21) Appl. No.: 11/008,144

(22) Filed: Dec. 10, 2004

(65) Prior Publication Data

US 2005/0140574 A1 Jun. 30, 2005

(30) Foreign Application Priority Data

Dec. 10, 2003 (JP) ............................. 2003-412370

(51) Int. Cl.
*G06F 3/02* (2006.01)
*H04B 1/38* (2006.01)

(52) U.S. Cl. ...................................... 345/169; 455/566

(58) Field of Classification Search ......... 345/168–169, 345/156; 455/556.1, 556, 561
See application file for complete search history.

(56) References Cited

U.S. PATENT DOCUMENTS

| 5,856,827 | A | 1/1999 | Sudo | |
|---|---|---|---|---|
| 6,297,945 | B1 * | 10/2001 | Yamamoto | 361/681 |
| 6,812,954 | B1 | 11/2004 | Priestman et al. | |
| 6,907,276 | B2 * | 6/2005 | Toba | 455/566 |
| 7,016,704 | B2 * | 3/2006 | Pallakoff | 455/566 |
| 7,205,959 | B2 * | 4/2007 | Henriksson | 345/4 |
| 2001/0049296 | A1 | 12/2001 | Lee et al. | |
| 2002/0009080 | A1 | 1/2002 | Engstrand et al. | |
| 2003/0052964 | A1 | 3/2003 | Priestman et al. | |
| 2004/0108968 | A1 | 6/2004 | Flnke-Anlauff | |
| 2005/0245288 | A1 | 11/2005 | Priestman et al. | |

FOREIGN PATENT DOCUMENTS

| CN | 1167390 A | 12/1997 |
|---|---|---|
| CN | 1300497 A | 6/2001 |
| JP | 10-200960 | 7/1998 |
| JP | 2003-8714 | 1/2003 |
| WO | WO 99/59312 | 11/1999 |

OTHER PUBLICATIONS

Electronic Translation of Japanese Publication No. 2003-008714.*
Chinese Office Action issued in corresponding Chinese Patent Application No. CN 2004101002458, dated Dec. 8, 2006.

* cited by examiner

*Primary Examiner*—Amr Awad
*Assistant Examiner*—Stephen G Sherman
(74) *Attorney, Agent, or Firm*—McDermott Will & Emery LLP

(57) ABSTRACT

In the portable information terminal device 1a, when a second display portion 9 is flipped over to the front of the portable information terminal device 1a, a first display portion 3 and the second display portion 9 are visible from a user at the same time. The display layouts of the first display portion 3 and the second display portion 9 are switched automatically in accordance with the visibility status of the respective display screens. The display layouts are also switched automatically in response to a change in information to be displayed. Therefore, a plurality of information items can be displayed in an appropriate layout that is easy to grasp to the user.

9 Claims, 26 Drawing Sheets

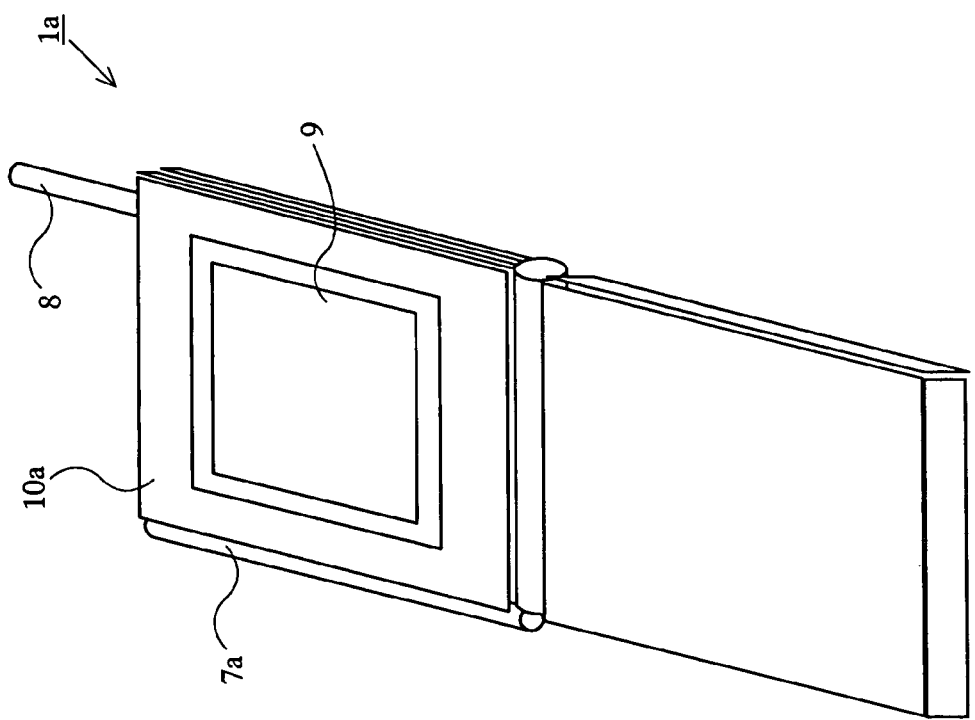
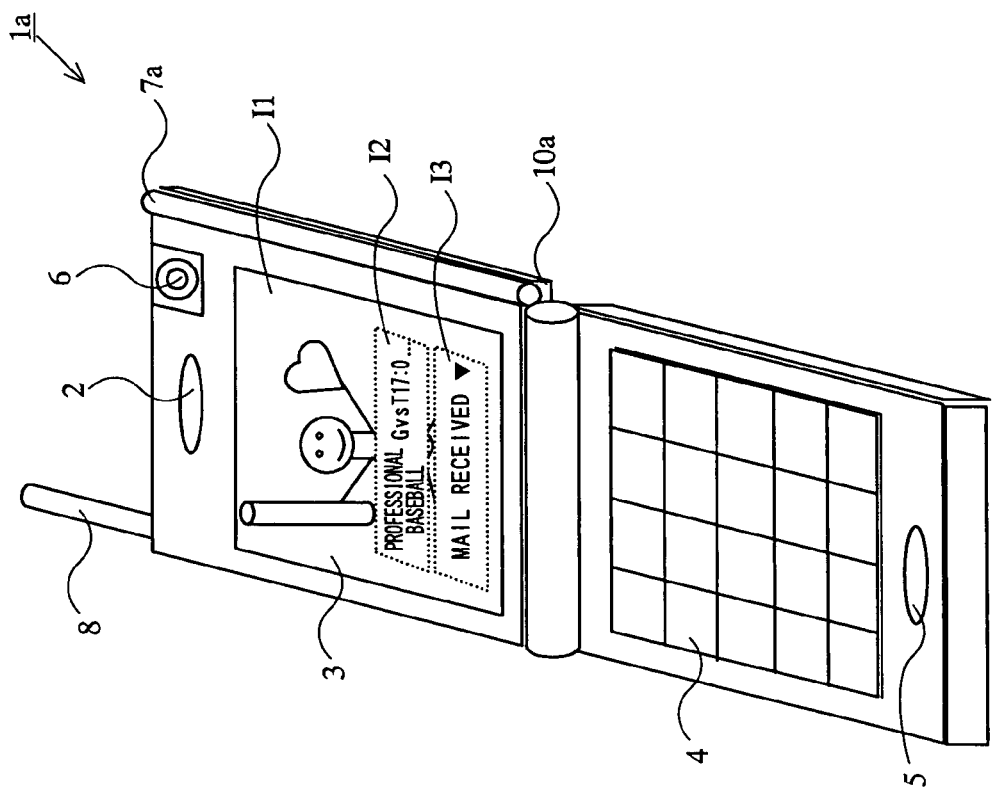

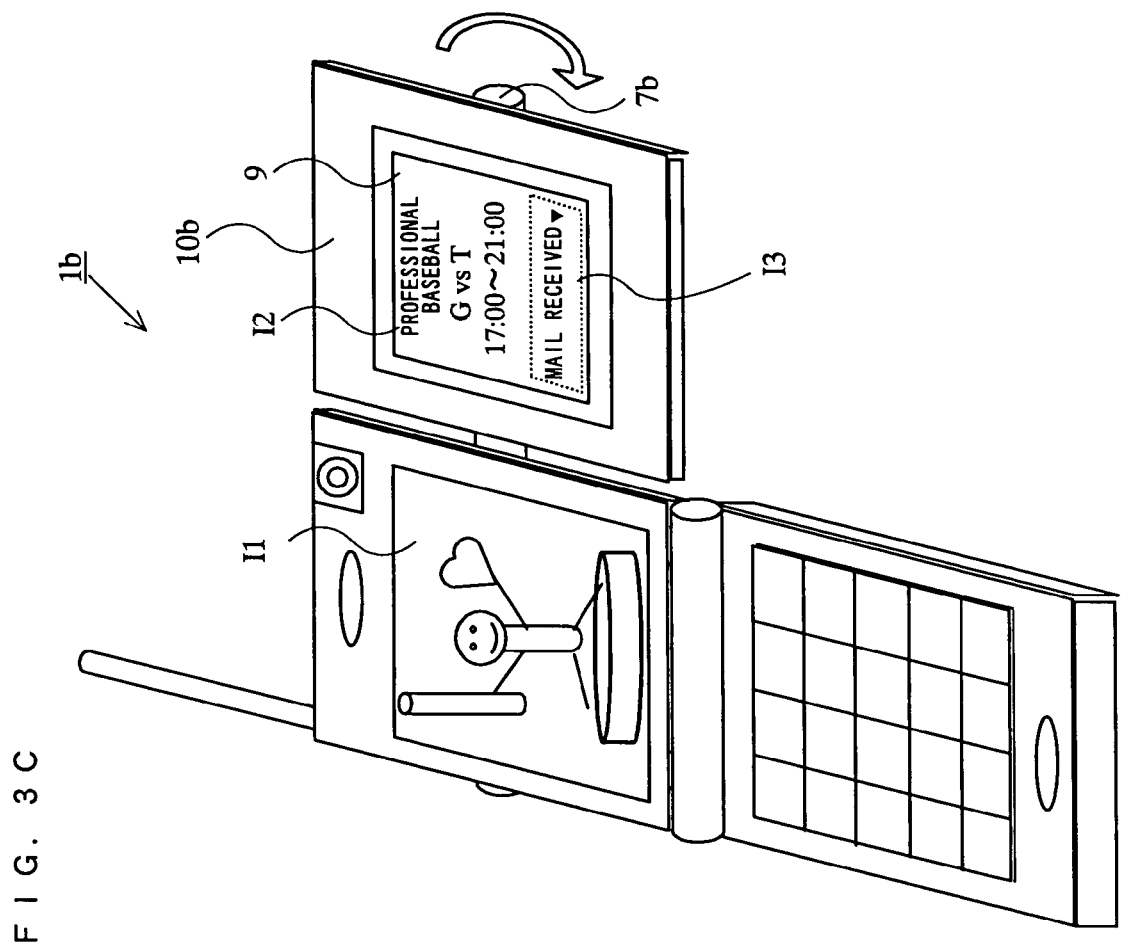

FIG. 5

| DISPLAY INFORMATION | DISPLAY | FIRST DISPLAY PORTION SELECTION |
|---|---|---|
| EPG | ON | OFF |
| TV IMAGE | ON | ON |
| TV OPERATION | OFF | ON |
| MAIL RECEIVED | OFF | OFF |

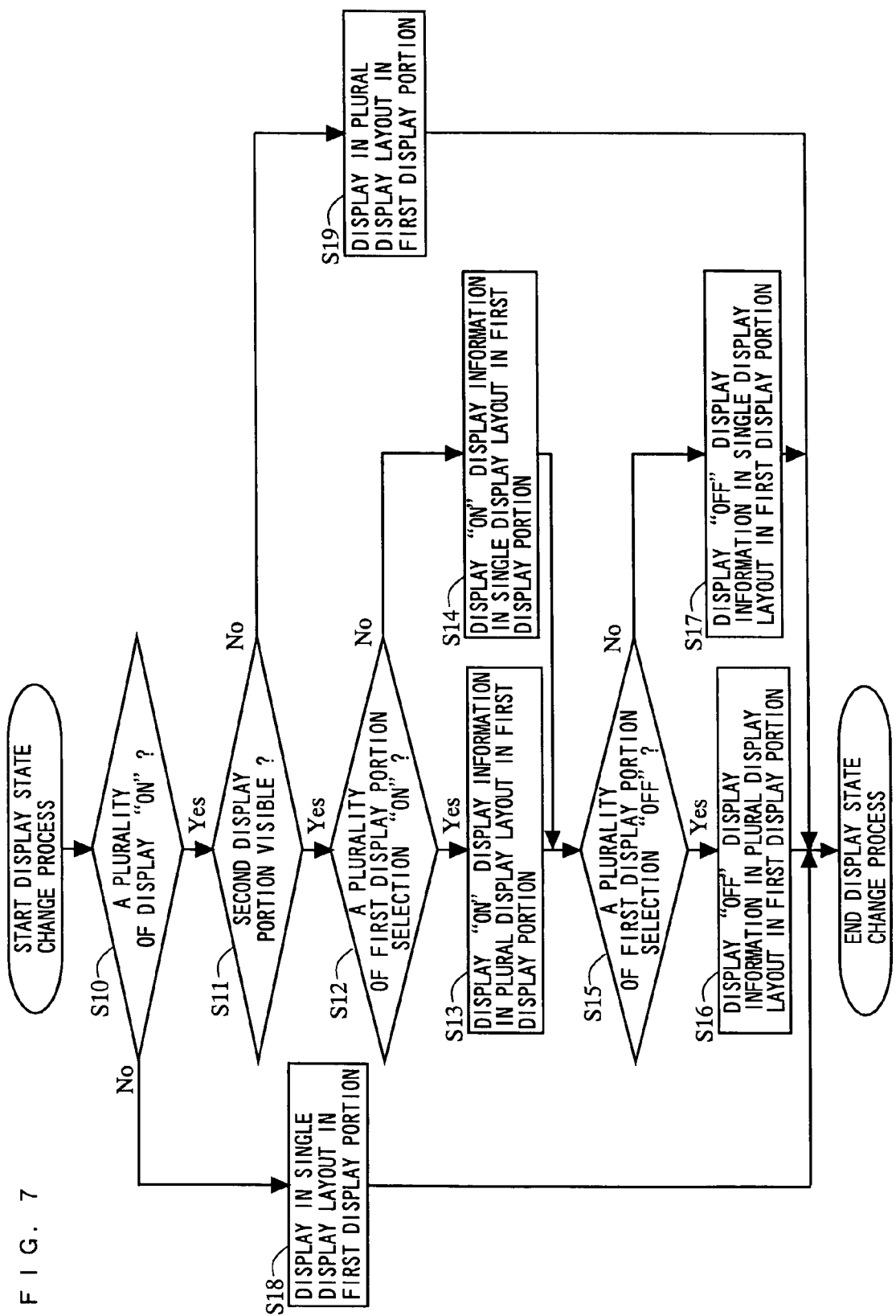

FIG. 9A

| DISPLAY INFORMATION | DISPLAY | FIRST DISPLAY PORTION SELECTION |
|---|---|---|
| EPG | OFF | OFF |
| TV IMAGE | OFF | ON |
| TV OPERATION | OFF | ON |
| EDITING MAIL | ON | OFF |

FIG. 9B

| DISPLAY INFORMATION | DISPLAY | FIRST DISPLAY PORTION SELECTION |
|---|---|---|
| EPG | OFF | OFF |
| TV IMAGE | ON | ON |
| TV OPERATION | OFF | ON |
| EDITING MAIL | ON | OFF |

FIG. 11A

| DISPLAY INFORMATION | DISPLAY | FIRST DISPLAY PORTION SELECTION |
|---|---|---|
| EPG | OFF | OFF |
| TV IMAGE | OFF | OFF |
| TV OPERATION | OFF | OFF |
| EDITING MAIL | ON | ON |

FIG. 11B

| DISPLAY INFORMATION | DISPLAY | FIRST DISPLAY PORTION SELECTION |
|---|---|---|
| EPG | OFF | OFF |
| TV IMAGE | ON | OFF |
| TV OPERATION | OFF | OFF |
| EDITING MAIL | ON | ON |

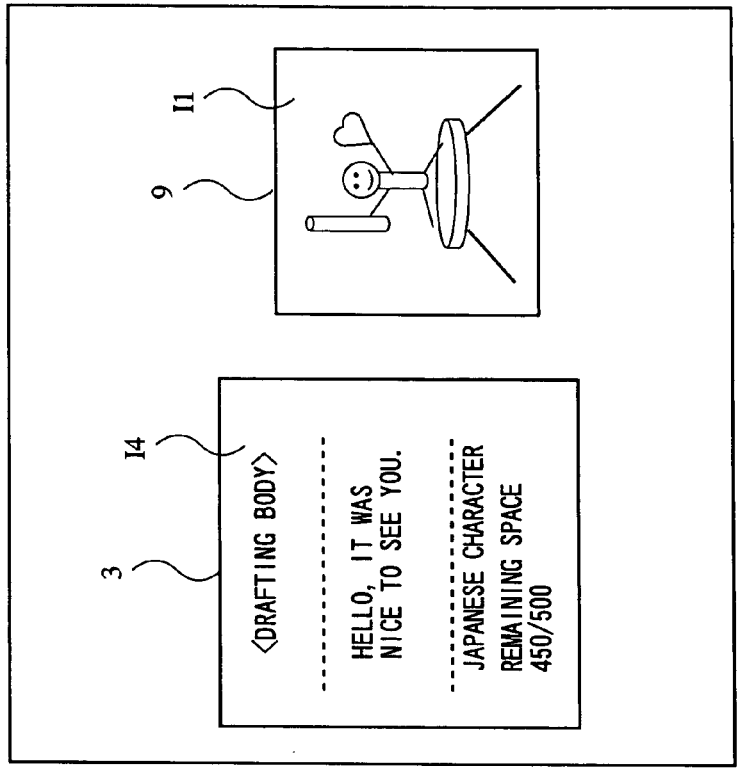
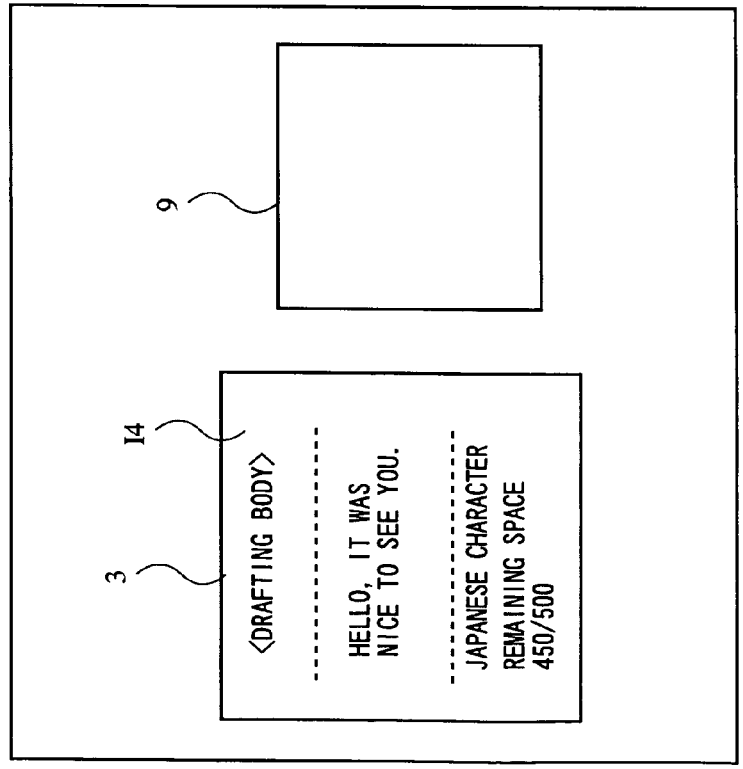
FIG. 12A
FIG. 12B

FIG. 13A

| DISPLAY INFORMATION | DISPLAY | FIRST DISPLAY PORTION SELECTION | EXCLUSIVE DISPLAY PORTION |
|---|---|---|---|
| RINGING | OFF | ON | ON |
| EPG | ON | OFF | OFF |
| TV IMAGE | ON | ON | OFF |
| TEXT CAPTIONS | ON | ON | OFF |
| CALL RECEIVED-NOTIFICATION | OFF | ON | OFF |
| MAIL EDIT | OFF | OFF | OFF |

FIG. 13B

| DISPLAY INFORMATION | DISPLAY | FIRST DISPLAY PORTION SELECTION | EXCLUSIVE DISPLAY PORTION |
|---|---|---|---|
| RINGING | ON | ON | ON |
| EPG | ON | OFF | OFF |
| TV IMAGE | ON | ON | OFF |
| TEXT CAPTIONS | ON | ON | OFF |
| CALL RECEIVED-NOTIFICATION | OFF | ON | OFF |
| MAIL EDIT | OFF | OFF | OFF |

FIG. 13C

| DISPLAY INFORMATION | DISPLAY | FIRST DISPLAY PORTION SELECTION | EXCLUSIVE DISPLAY PORTION |
|---|---|---|---|
| RINGING | OFF | ON | ON |
| EPG | ON | OFF | OFF |
| TV IMAGE | ON | ON | OFF |
| TEXT CAPTIONS | ON | ON | OFF |
| CALL RECEIVED-NOTIFICATION | ON | ON | OFF |
| MAIL EDIT | OFF | OFF | OFF |

FIG. 16A

| DISPLAY INFORMATION | DISPLAY | FIRST DISPLAY PORTION SELECTION | FIRST DISPLAY PORTION SELECTION |
|---|---|---|---|
| OPERATION SCREEN | ON | ON | ON |
| EPG | ON | OFF | OFF |
| TV IMAGE | ON | OFF | OFF |
| SUBTITLE | ON | OFF | OFF |
| COMMUNICATION CONTENTS LINK | OFF | OFF | OFF |
| COMMUNICATION CONTENTS | OFF | OFF | OFF |

FIG. 16B

| DISPLAY INFORMATION | DISPLAY | FIRST DISPLAY PORTION SELECTION | FIRST DISPLAY PORTION SELECTION |
|---|---|---|---|
| OPERATION SCREEN | OFF | ON | ON |
| EPG | ON | OFF | OFF |
| TV IMAGE | ON | ON | OFF |
| SUBTITLE | ON | ON | OFF |
| COMMUNICATION CONTENTS LINK | OFF | OFF | OFF |
| COMMUNICATION CONTENTS | OFF | OFF | OFF |

FIG. 18A

| DISPLAY INFORMATION | DISPLAY | FIRST DISPLAY PORTION SELECTION | FIRST DISPLAY PORTION SELECTION |
|---|---|---|---|
| OPERATION SCREEN | OFF | ON | ON |
| EPG | OFF | OFF | OFF |
| TV IMAGE | ON | ON | OFF |
| SUBTITLE | OFF | ON | OFF |
| COMMUNICATION CONTENTS LINK | ON | ON | OFF |
| COMMUNICATION CONTENTS | OFF | OFF | ON |

FIG. 18B

| DISPLAY INFORMATION | DISPLAY | FIRST DISPLAY PORTION SELECTION | FIRST DISPLAY PORTION SELECTION |
|---|---|---|---|
| OPERATION SCREEN | OFF | ON | ON |
| EPG | OFF | OFF | OFF |
| TV IMAGE | ON | ON | OFF |
| SUBTITLE | OFF | ON | OFF |
| COMMUNICATION CONTENTS LINK | OFF | ON | OFF |
| COMMUNICATION CONTENTS | ON | OFF | ON |

FIG. 21A

| DISPLAY INFORMATION | PRIORITY | DISPLAY |
|---|---|---|
| RINGING | 10 | OFF |
| ALARM | 9 | OFF |
| EPG | 8 | ON |
| TV IMAGE | 7 | ON |
| TV OPERATION | 7 | OFF |
| MAIL RECEIVED | 4 | ON |

| DISPLAY PORTION | LAYOUT SELECTION |
|---|---|
| FIRST DISPLAY PORTION | PLURAL DISPLAY LAYOUT |
| SECOND DISPLAY PORTION | SINGLE DISPLAY LAYOUT |

FIG. 21B

| DISPLAY INFORMATION | PRIORITY | DISPLAY |
|---|---|---|
| RINGING | 10 | OFF |
| ALARM | 9 | ON |
| EPG | 8 | ON |
| TV IMAGE | 7 | ON |
| TV OPERATION | 7 | OFF |
| MAIL RECEIVED | 4 | ON |

| DISPLAY PORTION | LAYOUT SELECTION |
|---|---|
| FIRST DISPLAY PORTION | PLURAL DISPLAY LAYOUT |
| SECOND DISPLAY PORTION | SINGLE DISPLAY LAYOUT |

F I G. 2 3 A

| DISPLAY INFORMATION | PRIORITY | DISPLAY |
|---|---|---|
| RINGING | 10 | OFF |
| ALARM | 9 | OFF |
| EPG | 8 | ON |
| TV IMAGE | 7 | ON |
| TV OPERATION | 7 | OFF |
| MAIL RECEIVED | 4 | ON |

| DISPLAY PORTION | LAYOUT SELECTION |
|---|---|
| FIRST DISPLAY PORTION | PLURAL DISPLAY LAYOUT |
| SECOND DISPLAY PORTION | SINGLE DISPLAY LAYOUT |

F I G. 2 3 B

| DISPLAY INFORMATION | PRIORITY | DISPLAY |
|---|---|---|
| RINGING | 10 | OFF |
| ALARM | 9 | OFF |
| EPG | 8 | ON |
| TV IMAGE | 7 | ON |
| TV OPERATION | 7 | ON |
| MAIL RECEIVED | 4 | ON |

| DISPLAY PORTION | LAYOUT SELECTION |
|---|---|
| FIRST DISPLAY PORTION | PLURAL DISPLAY LAYOUT |
| SECOND DISPLAY PORTION | SINGLE DISPLAY LAYOUT |

PORTABLE INFORMATION TERMINAL DEVICE

BACKGROUND OF THE INVENTION

1. Field of the Invention

The present invention relates to portable information terminal device having a plurality of display portions.

2. Description of the Background Art

In recent years, with the development of integration technologies and communication technologies, various data such as images, moving images and electronic mail can be read or seen using a portable information terminal device that can perform wireless communications. In particular, mobile telephones have been rapidly spread, not only for conventional voice communications, but also as a portable information terminal device that handles various data. In terrestrial digital television broadcasting, service targeting for portable information terminal devices including mobile telephones or mobile communication devices is scheduled to start.

However, in general, the portable information terminal device that displays information based on various data as described above has one display screen. Therefore, when displaying a plurality of information items on the display screen, it is necessary to superimpose image information and text information for display, or to switch or scroll the screen, so that the information is hard for a user to see. On the other hand, Japanese Laid-Open Patent Publication No. 10-200960 discloses an information terminal device provided with a plurality of display screens. The portable information terminal device disclosed in Japanese Laid-Open Patent Publication No. 10-200960 is provided with a plurality of display screens, and can display information on different display screens, depending on the kind of the received information.

However, in the portable information terminal device disclosed in Japanese Laid-Open Patent Publication No. 10-200960, the display screen on which each information item is to be displayed is predetermined, depending on the kind of the received information, and therefore only one display screen may be used for display, depending on the received information. Furthermore, in the portable information terminal device, it is not possible to switch a plural screen layout in which a plurality of information items are laid out and displayed on one display screen to a single screen layout in which one information item is laid out and displayed alone or to switch in the other way, or to change the screen layout dynamically, for example, to add or deleted is play information. In other words, it is difficult to display a plurality of received information items on the display screens in an appropriate layout that agrees with the user of the portable information terminal device or the situation where information is received.

SUMMARY OF THE INVENTION

Therefore, an object of the present invention is to provide a portable information terminal device displaying a plurality of information items on a plurality of display screens in an appropriate layout in accordance with the operation state of the device or the received information.

The present invention has the following features to attain the object mentioned above. The parenthesized reference numerals and the numerals for the steps only indicate correspondence to the embodiments described later to facilitate the understanding of the present invention and do not limit the scope of the present invention.

A portable information terminal device (1) of the present invention receives and displays a plurality of information items. The portable information terminal device includes a receiving portion (11, 12), a first display portion (3), a second display portion (9) and a video control portion (14). The receiving portion receives the plurality of information items. The first display portion displays at least one received information item using its display screen. The second display portion displays at least one received information item using a display screen different from the display screen of the first display portion. The video control portion sets a layout in which the information items are displayed in the first display portion and the second display portion, based on a condition (display information list) by which the information items received by the receiving portion are allocated to the first display portion or the second display portion.

The video control portion performs setting in such a manner that when a single information item is allocated to either one of the first display portion and the second display portion, a single display layout is set in which only the information item is displayed exclusively on the entire display screen of the either one of the first display portion and the second display portion (S14, S17, S24, S27, S33, S28, S29, S44, S47), and when a plurality of information items are allocated to either one of the first display portion and the second display portion, a plural display layout is set in which the information items are displayed by sharing the display screen of the either one of the first display portion and the second display portion (S13, S16, S19, S23, S26, S32, S46, S49).

The portable information terminal device of the present invention can assume various embodiments as follows. In a first example (1a, 1b) of the portable information terminal device, predetermined operation can change between a first state (FIG. 2 and FIG. 3C) in which the display screen of the first display portion and the display screen of the second display portion are visible at the same time from the same direction, and a second state (FIG. 1A and FIG. 3A) in which only the display screen of the first display portion is visible from that direction. An example is such that the display screen of the first display portion is provided on a surface of a housing in the first state and the second state, the display screen of the second display portion is provided on the surface of the housing in the first state and is provided facing a back face side of the housing by closing a support member (10a) for supporting the display screen to the back face side of the housing in the second state. Another example is such that the display screen of the first display portion is provided on a surface of a housing in the first state and the second state, the display screen of the second display portion is provided on the surface of the housing in the first state and is provided facing a back face side of the housing by turning over a support member (10b) for supporting the display screen about a predetermined rotation shaft (7b) and then moving the support member to the back face side of the housing in the second state.

Furthermore, the above-described portable information terminal device (15) may further include a display state determining portion for determining whether the first display portion and the second display portion are in the first state or the second state. In this case, wherein the video control portion performs setting in such a manner that when the display state determining portion determines that the first display portion and the second display portion are in the first state (Yes at S11), a layout is set in which the information items received by the receiving portion are allocated to and displayed in the first display portion and the second display portion, based on the condition (S12 to S17), and when the display state determining portion determines that the first display portion and the second display portion are in the second state (No at S11), a layout is set in which all of the information items received by the receiving portion are displayed in the first display portion (S19). Furthermore, the portable information terminal device may further include a storing portion (17) for storing a display information list describing an instruction (first display portion selection flag) to allocate the information items that can be received by the receiving portion (display information) to the first display portion or the second display portion for each information item as the condition. In this case, the video control portion sets a layout in which the information items received by the receiving portion are allocated to and displayed in the first display portion and the second display portion, based on the instruction described in the display information list stored in the storing portion, when the display state determining portion determines that the first display portion and the second display portion are in the first state.

A second example (1c) of the portable information terminal device further includes an information change detecting portion (19) for detecting an increase or a decrease of the information items received by the receiving portion. In this case, the video control portion sets a layout in which the information items received by the receiving portion are allocated to and displayed in the first display portion and the second display portion, based on the condition, in response to detection of an increase or a decrease of the information items in the information change detecting portion (S21 to S33). Furthermore, the above-described portable information terminal device may further include a storing portion for storing a display information list describing an instruction to allocate the information items that can be received by the receiving portion to the first display portion or the second display portion for each information item as the condition. In this case, the video control portion sets a layout in which the information items received by the receiving portion are allocated to and displayed in the first display portion and the second display portion, based on the instruction described in the display information list stored by the storing portion, in response to detection of an increase or a decrease of the information items in the information change detecting portion. Furthermore, the portable information terminal device may further include an operating portion (4) for outputting an operation signal in response to an operation of a user. In this case, the instruction described in the display information list stored in the storing portion is changed, based on the operation signal that is output from the operating portion by a user performing a predetermined operation.

Furthermore, in the display information list stored in the storing portion, an instruction (display portion exclusive flag) for exclusive display may be further described for an information item that is to be displayed exclusively on the entire display screen of the first display portion or the second display portion of the information items that can be received by the receiving portion. In this case, when an information item for which the instruction for exclusive display is described is included in the information items received by the receiving portion in the display information list (Yes at S21), the video control portion sets a single display layout in which only the information item is displayed exclusively on the entire display screen of either one of the first display portion and the second display portion (S29). Furthermore, the video control portion may further set a plural display layout in which the display screen of the other one of the first display portion and the second display portion is shared by other information items (S32).

The above-described information change detecting portion can assume various embodiments as follows. A first example of the information change detecting portion is such that when the receiving portion has received an information item programmed to be received at a time at which a user programmed the information to be received, the information change detecting portion detects an increase of the information item. A second example of the information change detecting portion is such that when the receiving portion has received an emergency warming system, the information change detecting portion detects an increase of the information item. A third example of the information change detecting portion is such that when the receiving portion has received text captions data, the information change detecting portion detects an increase of the information item. A fourth example of the information change detecting portion is such that in the case where the portable information terminal device further includes a transmitting and receiving portion having a telephone function, when there is a call received through the telephone function in the transmitting and receiving portion, the information change detecting portion detects an increase of the information item. A fifth example of the information change detecting portion is such that in the case where the portable information terminal device further includes a transmitting and receiving portion having a mail function, when a mail is received through the mail function in the transmitting and receiving portion, the information change detecting portion detects an increase of the information item. A sixth example of the information change detecting portion is such that when a predetermined time has passed, the information change detecting portion detects an increase of an information item indicating that the time has passed.

A third example (1d) of the portable information terminal device further includes a priority storing portion (171) for storing a priority for each information item that can be received by the receiving portion as the condition. In this case, the video control portion sets in a single display layout in which only an information item (A) having a highest priority stored in the priority storing portion of the information items received by the receiving portion is displayed exclusively on the entire display screen of either one of the first display portion and the second display portion (S44, S47). The video control portion may set a layout of simple display in which a content of an information item having a priority that is a threshold or less stored in the priority storing portion of the information items received by the receiving portion is displayed in a simple manner (S45, S48). Furthermore, when there are a plurality of information items having a highest priority stored in the priority storing portion of the information items received by the receiving portion, the video control portion may set in a plural display layout in which only the plurality of information items having a highest priority are displayed by sharing the display screen of either one of the first display portion and the second display portion.

As an example, the information items received by the receiving portion include at least broadcasting data including at least one of video signals, audio signals, and text information. In this case, the portable information terminal device further includes an input/output control portion (13) for outputting the video signals and the text information from the broadcasting data received by the receiving portion to the video control portion, and the video control portion sets a layout in which at least the video signals and the text information that are output from the input/output control portion are displayed in the first display portion and the second display portion, based on the condition. As another example, the information items received by the receiving portion include at least broadcasting data including at least one of video signals of MPEG format, audio signals, and text information. In this case, when the receiving portion has received the broadcasting data, a transport stream representing the broadcasting data is output, the portable information terminal device further comprising an input/output control portion for outputting video data and audio data by performing transport decoding and video/audio decoding with respect to the transport stream that is output from the receiving portion, wherein the video control portion sets a layout in which at least the video data that is output from the input/output control portion is displayed in the first display portion and the second display portion, based on the condition.

The first display portion and the second display portion may be configured by different display systems from each other. For example, the first display portion and the second display portion may be configured by a display system selected from the group consisting of LCD (liquid crystal display), organic EL (electroluminescent) and electric paper, and by different display systems from each other.

According to the portable information terminal device of the present invention, when received information is displayed in a plurality of display portions, the display layouts in the display portions can be switched automatically based on a predetermined condition. Furthermore, the display layout for display in each of the display portions can be switched automatically to a single display layout or a plural display layout, depending on the number of information items to be displayed.

According to a first example of the portable information terminal device, the display layouts are switched automatically, depending on the visibility status of the plurality of the display portions, and a plurality of information items can be displayed in an appropriate layout that is easy to grasp to the user. Furthermore, when a plurality of display portions are visible, the display layouts can be set as appropriate by allocating received information to the plurality of display portions, referring to a display information list.

According to a second example of the portable information terminal device, the display layouts are switched automatically, depending on an increase or a decrease of the number of received information items, and a plurality of information items can be displayed in an appropriate layout that is easy to grasp to the user. Furthermore, when a plurality of display portions are visible, the display layouts can be set as appropriate by allocating received information to the plurality of display portions, referring to a display information list. The content described in the display information list can be changed by an operation of the user, so that a display layout in accordance with an instruction of the user can be set.

When an instruction indicating exclusive display is described in the display information list, one information item is displayed exclusively on the entire screen of either one of the display portions. In this case, other information items can be displayed by sharing the non-exclusive display portion, so that the information items can be displayed without compromising the number of information items that the user can see.

The present invention can be applied when the information to be received is information that is programmed to be received, emergency warning system information, text captions data, calls received through a telephone function, mails received through a mail function, a timer, a alarm, information on elapsed time through a scheduling function or the like, or broadcasting data including digital television broadcasting data.

According to a third example of the portable information terminal device, a priority for exclusive display in the display portion is given to each information item to be displayed. Therefore, the display layouts of a plurality of display portions are switched automatically, depending on the priority, and information can be displayed in an appropriate layout that is easy to grasp without placing a burden on the user. Furthermore, it is possible to display an information item having a low priority in a simple manner, so that it is possible to provide an emphasis to the display layout in accordance with the degree of importance of information to be displayed. Furthermore, if the same priority is given to display information items that would cause a problem if they were displayed separately in the display portions, then they can always be displayed in the same display portion.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are a perspective view from the front and a perspective view from the back of a portable information terminal device 1a according to a first embodiment of the present invention;

FIGS. 3A, 3B and 3C are perspective views from the front of a portable information terminal device 1b in which a second display portion 9 is moved to a position at which it is visible from a user or a position at which it is not visible by an operation different from that of the portable information terminal device 1a of FIGS. 1A and 1B;

FIG. 5 is a diagram showing an example of a display information list stored in a storing portion 17 of FIG. 4;

FIG. 7 is a flowchart showing a display state change process that is performed by a video control portion 14 of FIG. 4;

FIGS. 9A and 9B are diagrams showing a first example of a display information list stored and updated in a storing portion 17 of FIG. 8;

FIGS. 11A and 11B are diagrams showing a second example of a display information list stored and updated in a storing portion 17 of FIG. 8;

FIGS. 12A and 12B are diagrams showing an example of display layouts of a first display portion 3 and a second display portion 9, respectively, based on the display information list of FIG. 11;

FIGS. 13A, 13B and 13C are diagrams showing a third example of a display information list stored and updated in a storing portion 17 of FIG. 8;

FIGS. 16A and 16B are diagrams showing a fourth example of a display information list stored and updated in a storing portion 17 of FIG. 8;

FIGS. 18A and 18B are diagrams showing a fifth example of a display information list stored and updated in a storing portion 17 of FIG. 8;

FIGS. 21A and 21B are diagrams showing a first example of a display information list and a setting status of a display portion that are stored and updated in a storing portion 17 of FIG. 20;

FIGS. 23A and 23B are diagrams showing a second example of a display information list and a setting status of a display portion that are stored and updated in a storing portion 17 of FIG. 20;

DESCRIPTION OF THE PREFERRED EMBODIMENTS

First Embodiment

Figure 2:
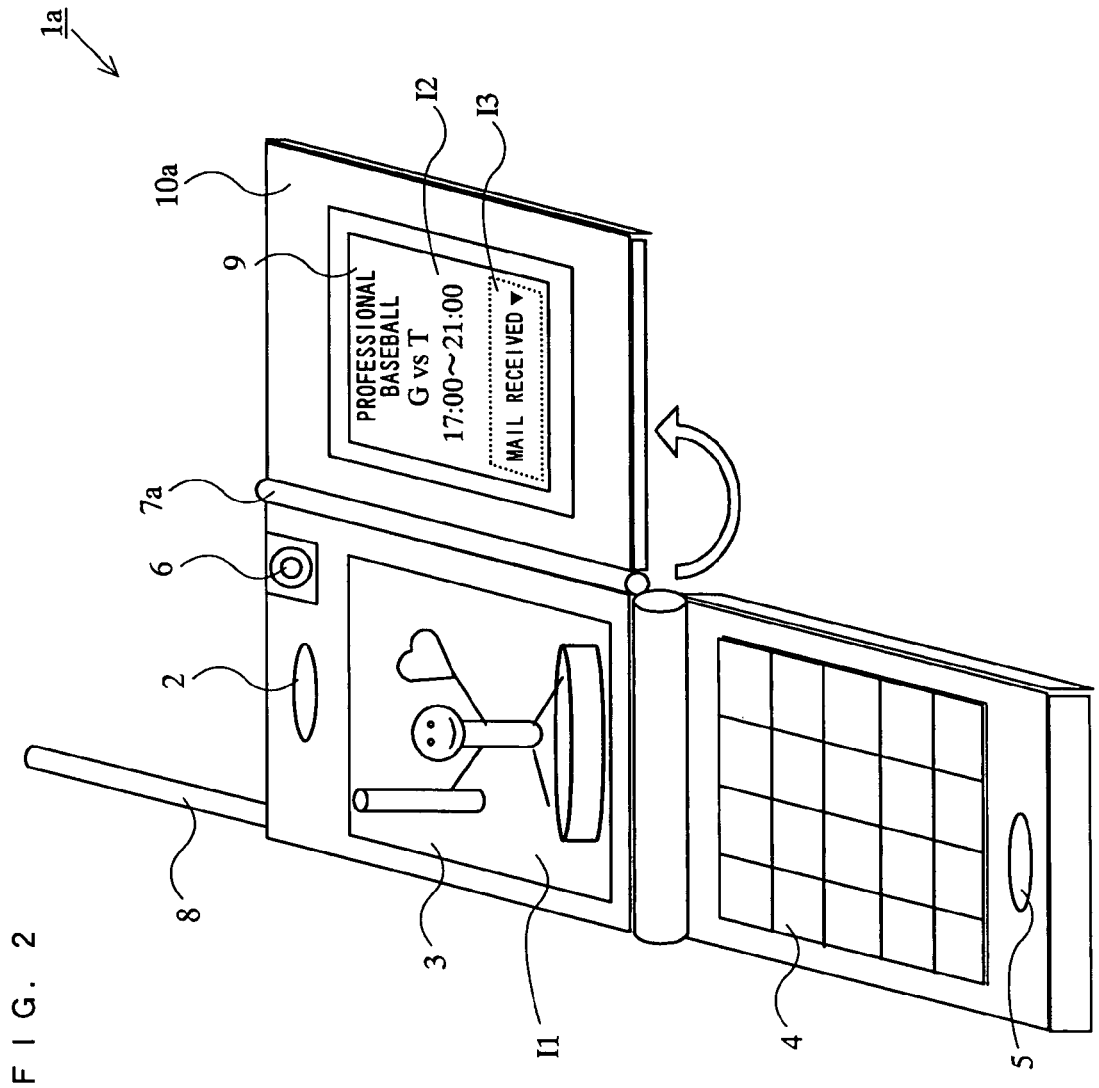
FIG. 2 is a perspective view from the front showing a state in which a back plate 10a of the portable information terminal device 1a of FIGS. 1A and 1B is open.

Hereinafter, a portable information terminal device according to a first embodiment of the present invention will be described with reference of the accompanying drawings. In the following description, examples in which the portable information terminal device is applied to a mobile telephone and similar equipment are used. FIG. 1A is a perspective view from the front of a portable information terminal device 1a, and FIG. 1B is a perspective view from the back of the portable information terminal device 1a. FIG. 2 is a perspective view from the front showing a state in which a back plate 10a of the portable information terminal device 1a is open.

In FIG. 1, a portable information terminal device 1a includes a speaker 2, a first display portion 3, an operation key set 4, a microphone 5, a camera 6, a rotation shaft 7a, an antenna 8, a second display portion 9, and a back plate 10a. The portable information terminal device 1a transmits and receives information via the antenna 8. In the portable information terminal device 1a, conventional voice speech is output from the speaker 2 and input to the microphone 5. Operation data is input from the operation key set 4 in response to an operation of a user of the portable information terminal device 1a. The first display portion 3 is a surface display that is disposed on the front face of the portable information terminal device 1a and whose display screen faces the front. The second display portion 9 is a back display that is disposed in the back face of the portable information terminal device 1a in a state in which the back plate 10a is closed (state of FIG. 1B) and whose display screen faces the back direction. If the portable information terminal device 1a has an image-capturing function, the camera 6 is provided. The first display portion 3 and the second display portion 9 may be configured both with LCD (liquid crystal display), or they may be configured with different display systems, for example, LCD and organic EL (electroluminescent). Alternatively, the display portions may be configured with other display systems such as electronic paper and polysilicon liquid crystal, with LCD with or without a backlight, with systems in which the displays are controlled with different voltages.

The operation key set 4 has a plurality of key switches and can receive a request to change display information from the user. For example, the operation key set 4 outputs a signal instructing to change a display layout to the video control portion 14 in response to an operation indicating a display addition request with respect to a TV image from the user. Other layout changes are, for example, deletion of displayed information, movement of a display area and the like. The camera 6 outputs data of captured images that have been captured via a lens in response to a camera operation request from the user to the video control portion 14.

The portable information terminal device 1a is provided with the rotation shaft 7a, and the back plate 10a can be closed or opened by pivoting about this rotation shaft 7a. The back plate 10a is positioned on the back side of the portable information terminal device 1a in the closed state (state of FIG. 1) and is flipped over to the front side of the portable information terminal device 1a in the open state (state of FIG. 2). As shown in FIGS. 1B and 2, the second display portion 9 is formed on one side of the back plate 10a and is flipped over to the front side of the portable information terminal device lain the open state. In other words, the second display portion 9 is moved to a position that allows the second display portion to be visible together with the first display portion 3 by opening the back plate 10a. When the back plate 10a is closed, only the first display portion 3 facing the user is visible, and in this state, display is performed in the following manner in order to display a plurality of information items received by the portable information terminal device 1a. For example, display areas are displayed while being overlapped in the first display portion 3, or the display area is divided for each information item so that information is displayed in a multi-window. When the back plate 10a is closed, the second display portion 9 positioned in the back face of the portable information terminal device 1a is not visible to the user from the front, so that information received by the portable information terminal device 1a or the like is not displayed thereon. On the other hand, when the second display portion 9 is flipped over to the front face of the portable information terminal device 1a, the first display portion 3 and the second display portion 9 are visible at the same time from the user. Therefore, it is possible to display a plurality of information items in a display layout in which the information items are allocated to the first display portion 3 and the second display portion 9.

For example, as shown in FIGS. 1A and 1B, when the back plate 10a is closed, a TV image I1, program information I2 and mail-reception information I3 are displayed in a plural display layout in the first display portion 3, and no information is displayed in the second display portion 9. When the back plate 10a is open, display is performed in a single display layout in which only the TV image I1 is displayed in the first display portion 3, and the program information I2 and the mail-reception information I3 are displayed in a plural display layout in the second display portion 9. In this manner, when the back plate 10a is open, the TV image I1 is displayed in the first display portion 3 without losing any portion of the image on the screen, and the program information I2 and the mail-reception information I3 are displayed in the second display portion 9, so that the portable information terminal device 1a provides changing the interface to one that is easy to grasp to the user.

Figure 3A:
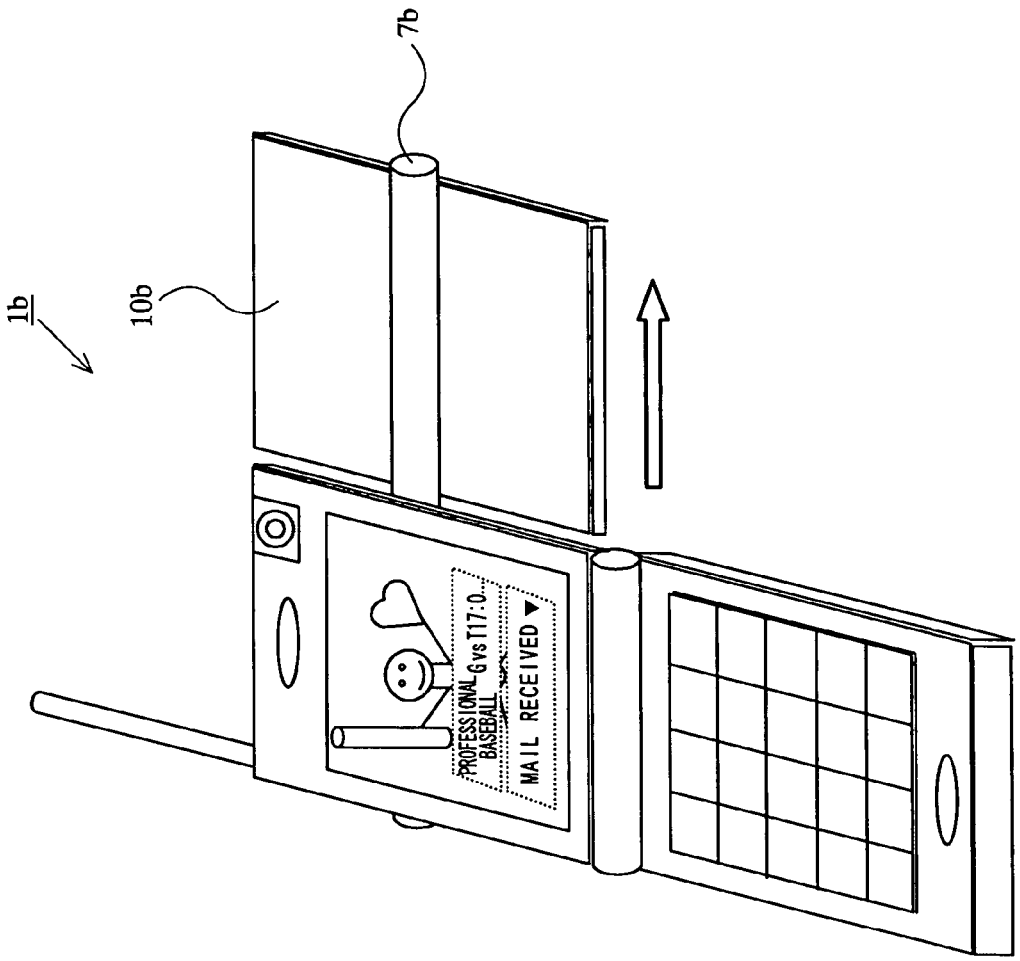
Figure 3B:
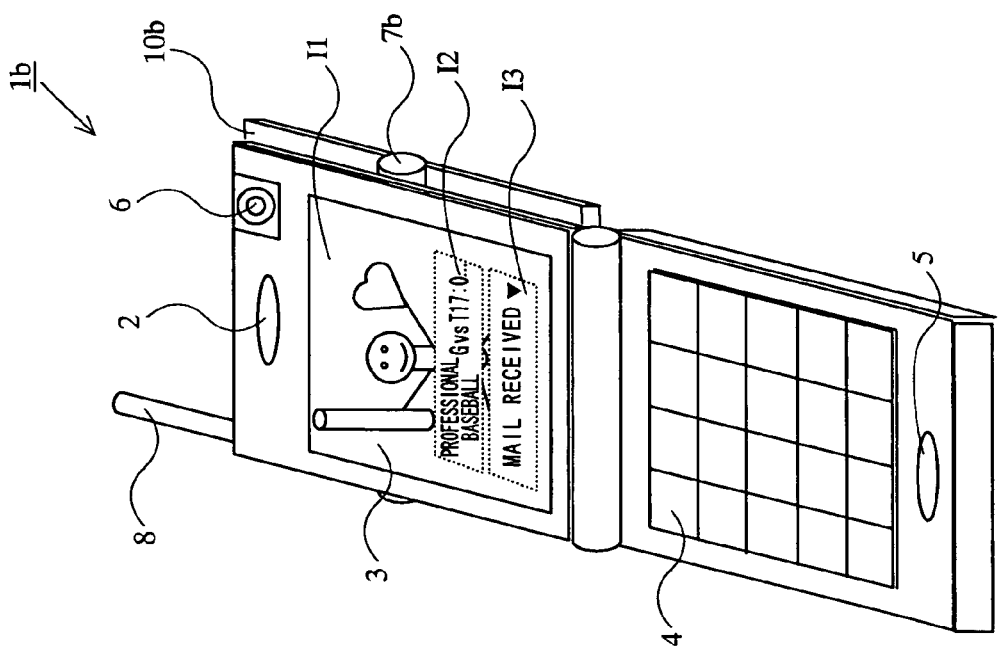

As described above, the second display portion 9 of the portable information terminal device 1a can be moved to a position at which the second display portion 9 is visible from the user or a position at which it is not visible by opening/closing the back plate 10a pivoting about the rotation shaft 7a. The same function can be realized by other operations. FIGS. 3A, 3B and 3C are perspective views from the front of a portable information terminal device 1b in which a second display portion 9 is moved to a position at which the second display portion 9 is visible from a user or a position from which it is not visible by another operation.

In FIGS. 3A to 3C, the portable information terminal device 1b is provided with a retractable rotation shaft 7b, and the back plate 10b can pivot about this rotation shaft 7b. The second display portion 9 is formed on one side of the back plate 10b. As shown in FIG. 3A, the back plate 10b is positioned on the back face of the portable information terminal device 1b with the rotation shaft 7b being retracted, so that the second display portion 9 is located on the back face of the portable information terminal device 1b, and its display screen faces the back direction. Then, as shown in FIG. 3B, the back plate 10b is drawn out from the back face of the portable information terminal device 1b by extending the rotation shaft 7b in the direction shown by the arrow in FIG. 3B. Thereafter, as shown in FIG. 3C, the display screen of the second display portion 9 becomes visible from the front side of the portable information terminal device 1b by rotating the back plate 10b about the rotation shaft 7b. Thus, the operation of the second display portion 9 is not limited to the opening/closing operation (folding/unfolding operation) shown by the portable information terminal device 1a, but a configuration in which the second display portion 9 is moved to such a position as to be visible by the retraction and rotation operation as shown by the portable information terminal device 1b can be used.

Figure 4:
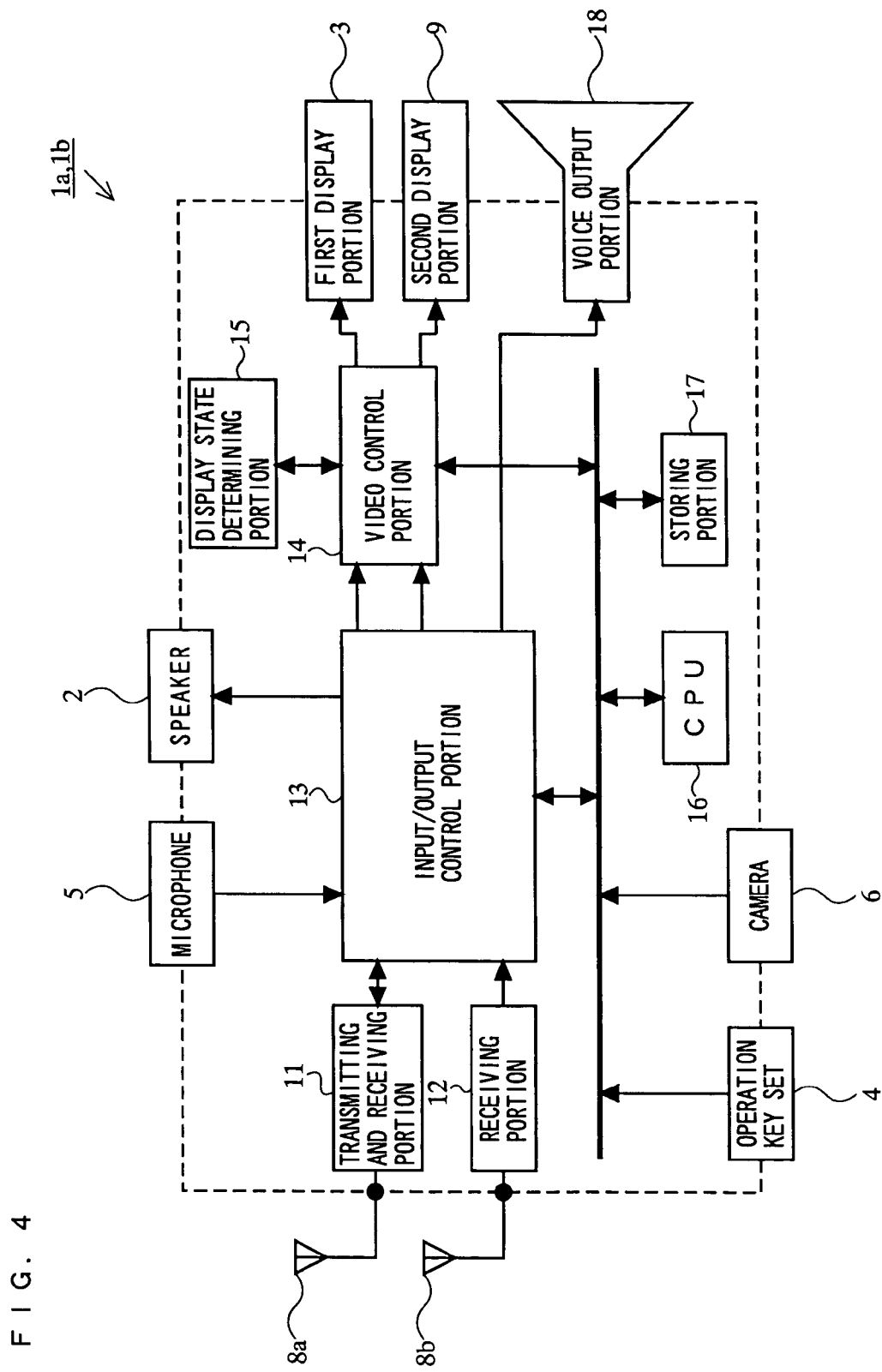
FIG. 4 is a block diagram showing the internal configuration of the portable information terminal devices 1a and 1b of FIGS. 1 and 3.

Next, the internal configuration of the portable information terminal devices 1a and 1b will be described with reference to FIG. 4. FIG. 4 is a block diagram showing the internal configuration of the portable information terminal devices 1a and 1b. The portable information terminal devices 1a and 1b are different only in the operation of the back plates 10a and 10b as described above and have the same internal configuration, so that in the following description, they are collectively referred to as "portable information terminal device 1".

In FIG. 4, a portable information terminal device 1 includes the speaker 2, the first display portion 3, the operation key set 4, the microphone 5, the camera 6, the antenna 8, and the second display portion 9 that are described above, and further includes a transmitting and receiving portion 11, a receiving portion 12, an input/output control portion 13, a video control portion 14, a display state determining portion 15, a CPU 16, a storing portion 17, and a voice output portion 18.

The antennas 8a and 8b are provided so that the portable information terminal device 1 performs wireless communications for sending and receiving data, and the antenna 8 shown in FIGS. 1 to 3 can be used for the two purposes. Furthermore, the antenna 8 shown in FIGS. 1 to 3 can be used as the antenna 8a, and the antenna 8b can be configured with another member (e.g., built-in antenna). The other components that are described with reference to FIGS. 1 to 3 are the same as above, so that they are not described in detail.

The transmitting and receiving portion 11 demodulates received data that is received via the antenna 8a and outputs the data to the input/output control portion 13, and modulates transmitting data that is input from the input/output control portion 13 and outputs the data via the antenna 8a. The transmitting and receiving portion 11 performs data communications with databases of other information devices or information providers or the like and carries out voice speech with telephones or the like. The form of the communication network is not limited to wireless, but the public network, ISDN, communication terminals such as PHS, mobile telephones or the like can be used.

The antenna 8b is an antenna for receiving broadcasting. The receiving portion 12 demodulates received data that is received via the antenna 8b and outputs the data to the input/output control portion 13, and receives data from databases of other information devices or information providers or the like. The receiving portion 12 receives inputs from, for example, analog broadcasting, satellite digital broadcasting, terrestrial digital broadcasting.

The input/output control portion 13 extracts necessary data from the data that is input from the operation key set 4, the microphone 5, the camera 6, and the transmitting and receiving portion 11 and the receiving portion 12. Then, the input/output control portion 13 selects the speaker 2, the transmitting and receiving portion 11, the video control portion 14, the CPU 16, the storing portion 17 and the voice output portion 18, depending on the extracted data, and outputs the data.

The video control portion 14 generates video signals that are to be output to the first display portion 3 and the second display portion 9, using various data input from the input/output control portion 13 or the storing portion 17.

For example, an example of the operations of the above-described components will be described. When the antenna 8b receives broadcasting data that is constituted by MPEG video signals or audio signals, text information or the like, the receiving portion 12 receives the broadcasting data and outputs transport streams. The input/output control portion 13 receives the transport streams that are output from the receiving portion 12, and performs transport decoding, extraction of PSI/SI information and video/audio decoding. Then, the input/output control portion 13 outputs an electronic program list (EPG), program information and a program reception state to the storing portion 17, outputs video data to the video control portion 14, and outputs audio data to the voice output portion 18. The video control portion 14 receives the video data output from the input/output control portion 13, the electronic program list (EPG) or the program information that are output from the storing portion 17 and outputs the data either the first display portion 3 or the second display portion 9. In addition to the above-described data, for example, data broadcasting, emergency warning system (EWS), subtitles and text captions data can be input to the portable information terminal device 1.

Furthermore, the transmitting and receiving portion 11 also can transmit and receive network information via the antenna 8a. In this case, the input/output control portion 13 outputs information downloaded from the network that is input from the transmitting and receiving portion 11 to the storing portion 17, and outputs information to be uploaded that is input from the storing portion 17 to the transmitting and receiving portion 11. The video control portion 14 receives the downloaded data from the network that is output from the storing portion 17 and outputs the data either the first display portion 3 or the second display portion 9. Other than above, the transmitting and receiving portion 11 also can transmit and receive speech data, information on calls received/calls to be transmitted, mails to be transmitted and received mails, mail information, moving images attached to a mail, still image information, TV telephone data and the like.

The video control portion 14 performs display layout of videos that to be output to the first display portion 3 and the second display portion 9. For example, as shown in FIG. 1A, the video control portion 14 performs a plural information display layout in the following manner. A portion of the display screen is allocated to each information of the TV image I1, the program information I2 and mail received information I3 in the first display portion 3, the display area is divided for each information, and the display area is shared by information items so that a plurality of information items are displayed at the same time (hereinafter, referred to as "plural display layout"). This plural display layout may be performed such that only part of each information is displayed, depending on the content of the information, text information is abbreviated or symbolized, and the display size of image information is processed to be reduced so that a plurality of information items are displayed at the same time. The video control portion 14 also performs a single information display layout in which a single information item, that is, only the TV image I1, exclusively occupies the display screen in the first display portion 3, as shown in FIG. 2 (hereinafter, referred to as "single display layout").

The display state determining portion 15 detects whether or not the second display portion 9 is visible from the user at the same time with the first display portion 3. When the second display portion 9 is visible from the user at the same time with the first display portion 3, the display state determining portion 15 outputs a visible signal to the video control portion 14. When the second display portion 9 is not visible, the display state determining portion 15 outputs a non-visible signal to the video control portion 14. For example, in the case of the portable information terminal device 1 having the rotation shaft 7a or 7b as shown in FIGS. 1 to 3, when the rotation angle of the rotation shaft 7a or 7b is identified and is determined to be a threshold value or more, the display state determining portion 15 determines that the first display portion 3 and the second display portion 9 are visible at the same time and outputs a visible signal to the video control portion 14. On the other hand, when the rotation angle is less than a threshold value, the display state determining portion 15 determines that the first display portion 3 and the second display portion 9 are not simultaneously visible and outputs a non-visible signal to the video control portion 14.

A display information list is stored in the storing portion 17. Hereinafter, the display information list will be described with reference to FIG. 5. FIG. 5 is a diagram showing an example of a display information list stored in the storing portion 17.

In FIG. 5, a display flag and a first display portion selection flag corresponding to each of various display information item are described in the display information list. The display information is of the information type that can be displayed in the portable information terminal device 1, and for example, "EPG", "TV image", "TV operation", and "mail received" can be described. For the display flag, "ON" is described for display information to be displayed in the portable information terminal device 1 at the moment, and "OFF" is described for display information not to be displayed. The display flag is updated by a user designating information to be displayed with the operation key set 4, or updated in response to signals or data that are automatically received (e.g., a telephone call received or a mail received). For the first display portion selection flag, "ON" is described for display information to be displayed by priority in the first display portion 3, and "OFF" is described for the other display information. The first display portion selection flag is updated by a user designating information to be displayed by priority in the first display portion 3 with the operation key set 4. In the example of FIG. 5, the display flag "ON" is described for the display information "EPG", and "TV image", and the first display portion selection flag "ON" is described for "TV image" and "TV operation".

Figure 6B:
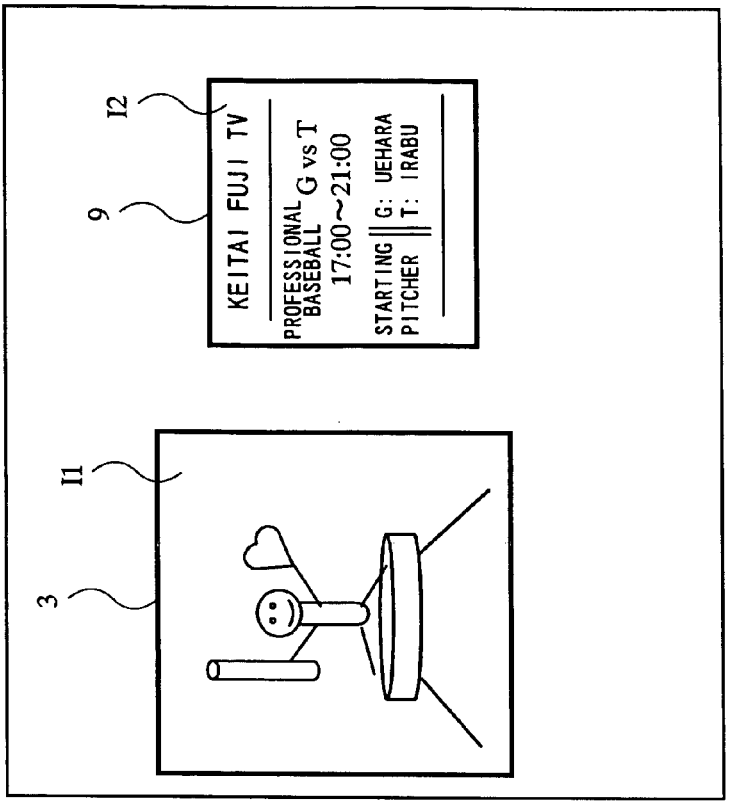
FIGS. 6A and 6B are diagrams showing an example of display layouts of a first display portion 3 and a second display portion 9, based on the display information list described with reference to FIG. 5.
Figure 6A:
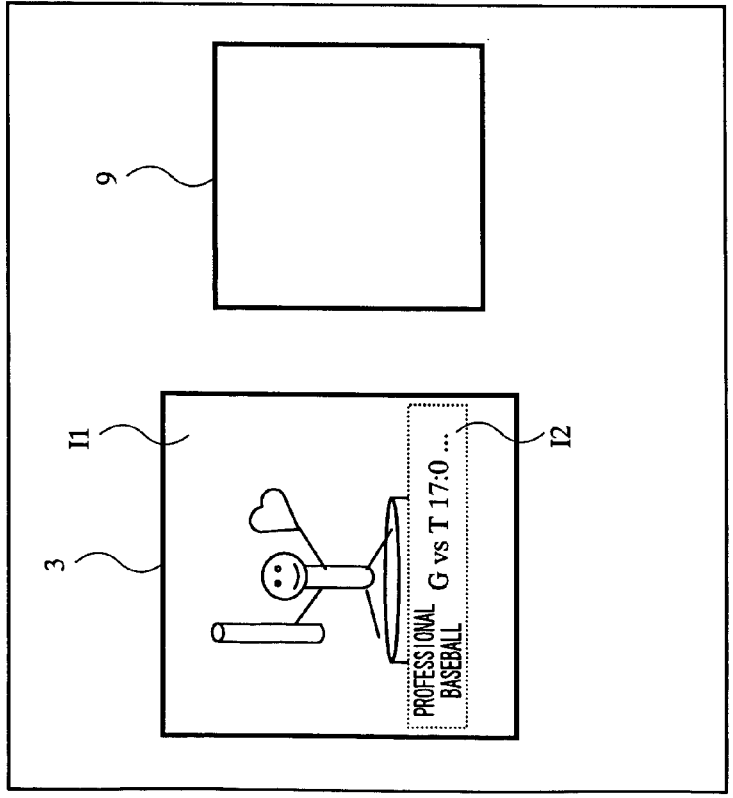

The video control portion 14 changes the layout in which various data that are input from the input/output control portion 13 or the storing portion 17 are displayed in the first display portion 3 and the second display portion 9, based on the visible signal/non-visible signal that is output from the display state determining portion 15 and the display information list stored in the storing portion 17. FIG. 6A is a diagram showing an example of a display layout of each of the first display portion 3 and the second display portion 9, based on the display information list described with reference to FIG. 5, when the non-visible signal is output. FIG. 6B is a diagram showing an example of a display layout of each of the first display portion 3 and the second display portion 9, based on the display information list described with reference to FIG. 5, when the visible signal is output.

In FIG. 6A, when the video control portion 14 receives a non-visible signal from the display state determining portion 15, the video control portion 14 stops the display in the second display portion 9 and lays out and displays all the display information whose display flag is "ON" in the first display portion 3. In the display information list shown in FIG. 5, the display flag "ON" is described for the display information "EPG" and "TV image". Therefore, the video control portion 14 displays the TV image I1, and EPG I2 in a plural display layout in the first display portion 3.

In FIG. 6B, when the video control portion 14 receives a visible signal from the display state determining portion 15, the video control portion 14 starts the display in the second display portion 9 and lays out and displays the display information whose display flag is "ON" in the first display portion 3 and the second display portion 9, based on the display information list. Since in the display information list shown in FIG. 5, the display flag "ON" is described for the display information "EPG" and "TV image", and the first display portion selection flag "ON" is described for "TV image" and "TV operation", the video control portion 14 displays the TV image I1 in a single display layout in the first display portion, and displays EPG I2 in a single display layout in the second display portion 9.

Hereinafter, the operation of the display state change process performed by the video control portion 14 will be described with reference to FIG. 7. FIG. 7 is a flowchart showing a display state change process that is performed by the video control portion 14. The display state change process that is performed by the video control portion 14 is started in response to the switching of the visible signal/non-visible signal that is output from the display state determining portion 15.

In FIG. 7, the video control portion 14 searches the display information list stored in the storing portion 17 and determines whether or not the display flag "ON" is described for a plurality of display information items (step S10). Then, the video control portion 14 moves the process to the next step S11 when the display flag "ON" is described for a plurality of display information items. On the other hand, the video control portion 14 moves the process to the next step S18 when the display flag "ON" is not described for a plurality of display information items.

In the step S11, the video control portion 14 determines whether or not the second display portion 9 is visible at the moment, based on the visible signal/non-visible signal that is output from the display state determining portion 15. Then, the video control portion 14 moves the process to the next step S12 when the second display portion 9 is visible and moves the process to the next step S19 when the second display portion 9 is not visible.

In step S12, the video control portion 14 searches for display information whose display flag is "ON" from the display information list stored in the storing portion 17 and determines regarding the display information whether or not there are a plurality of display information items whose first display portion selection flag is "ON". Then, when there are a plurality of display information items whose first display portion selection flag is "ON", the video control portion 14 displays this display information (i.e., display information whose display flag is "ON" and whose first display portion selection flag is "ON") in a plural display layout in the first display portion 3 (step S13) and moves the process to the next step S15. On the other hand, when there are not a plurality of display information items whose first display portion selection flag is "ON", the video control portion 14 displays the display information in a single display layout in the first display portion 3 (step S14) and moves the process to the next step S15. In step S14, when there is no display information whose first display portion selection flag is "ON", the video control portion 14 may display no information in the first display portion 3, or may select any information from the display information whose first display portion selection flag is "OFF" and whose display flag is "ON" and may display the display information in a single display layout in the first display portion 3.

In step 15, the video control portion 14 searches for display information whose display flag is "ON" from the display information list stored in the storing portion 17 and determines regarding the display information whether or not there are a plurality of display information items whose first display portion selection flag is "OFF". Then, when there are a plurality of display information items whose first display portion selection flag is "OFF", the video control portion 14 displays this display information (i.e., display information whose display flag is "ON" and whose first display portion selection flag is "OFF") in a plural display layout in the second display portion 9 (step S16) and ends the process according to the flowchart. On the other hand, when there are not a plurality of display information items whose first display portion selection flag is "OFF", the video control portion 14 displays the display information in a single display layout in the second display portion 9 (step S17) and ends the process according to the flowchart. In step S15, when there is no display information whose first display portion selection flag is "OFF", the video control portion 14 may display no information in the second display portion 9.

In step S18, the video control portion 14 displays a single display information item whose display flag is "ON" in a single display layout in the first display portion 3 and ends the process according to the flowchart. In step S19, the video control portion 14 displays a plurality of display information items whose display flag are "ON" in a plural display layout in the first display portion 3 and ends the process according to the flowchart.

Thus, according to the portable information terminal device of the first embodiment, the display layout is switched automatically depending on the visibility status of a plurality of display portions, and a plurality of information items can be displayed in an appropriate layout that is easy to grasp to the user.

Second Embodiment

Hereinafter, a portable information terminal device according to a second embodiment of the present invention will be described with reference to the accompanying drawings. In the first embodiment, an example in which the display layout is switched automatically depending on the visibility status of a plurality of display portions has been described. In the second embodiment, the display layout is switched automatically depending on a change in information to be displayed. When the portable information terminal device is applied to a mobile telephone or similar equipment, the portable information terminal device may have a configuration in which the second display portion 9 is operated so as to become visible or not visible as shown in FIGS. 1 to 3 or a configuration in which the first display portion 3 and the second display portion 9 are constantly visible from the user. The first display portion 3 and the second display portion 9 may be configured both with LCD, or they may be configured with different display systems, for example, LCD and organic EL (electroluminescent). Alternatively, the display portions may be configured with other display systems such as electronic paper and polysilicon liquid crystal, with LCD with or without a backlight, with systems in which the displays are controlled with different voltages. Hereinafter, an example in which the portable information terminal device has a configuration in which the first display portion 3 and the second display portion 9 are constantly visible from the user will be described.

Figure 8:
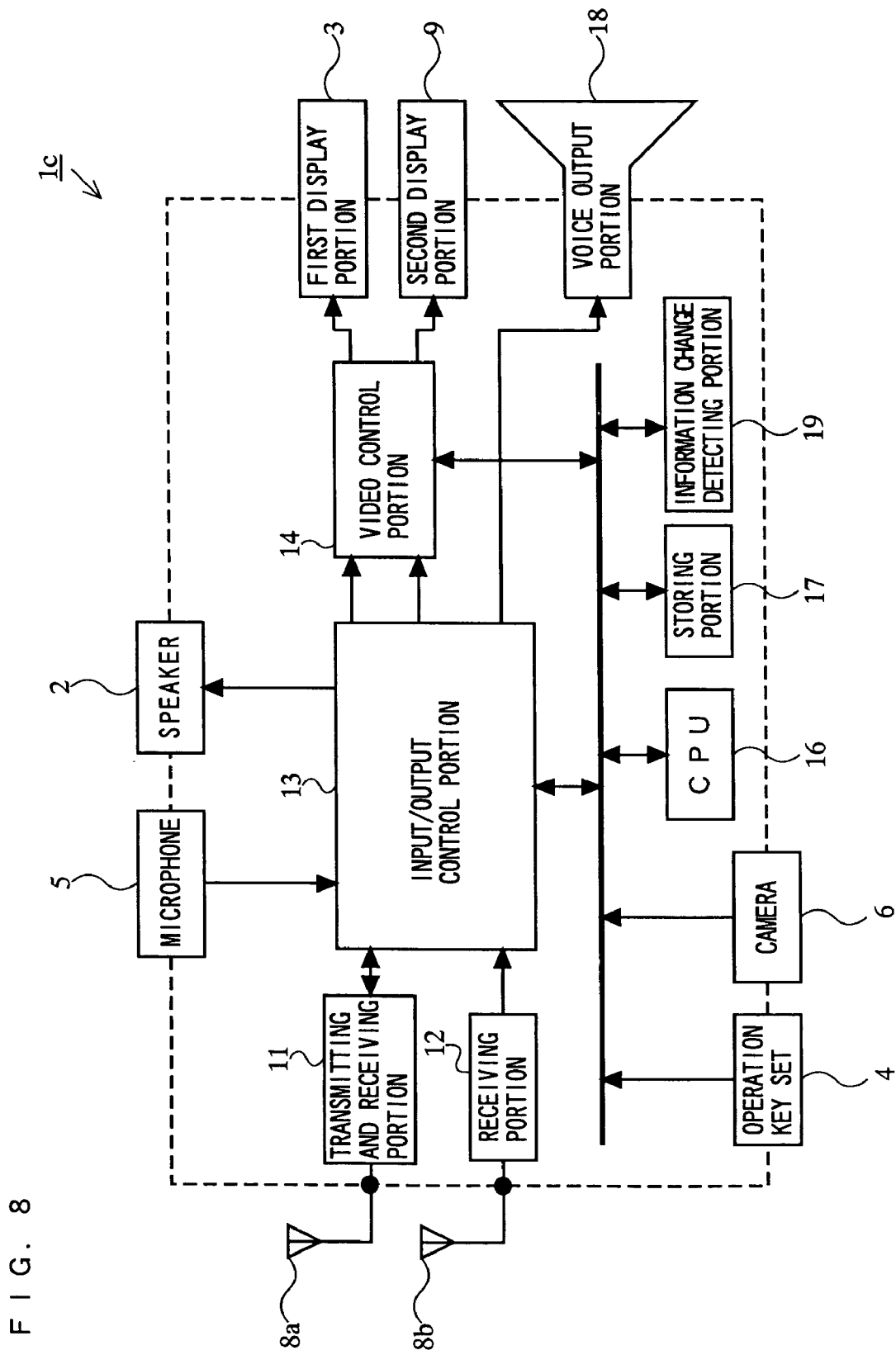
FIG. 8 is a block diagram showing the internal configuration of a portable information terminal devices 1c according to a second embodiment of the present invention.

Referring to FIG. 8, the internal configuration of a portable information terminal device 1c of the second embodiment will be described. FIG. 8 is a block diagram showing the internal configuration of the portable information terminal devices 1c. In the portable information terminal device 1c, the display state determining portion 15 provided in the portable information terminal devices 1a and 1b described in the first embodiment is deleted and an information change detecting portion 19 is added, and the other components are identical. Therefore, in describing the portable information terminal device 1c, the same components as those in the first embodiment bear the same reference numerals and are not described in detail.

In FIG. 8, the information change detecting portion 19 monitors a change in information input to the input/output control portion 13 and the update of the display information list, and outputs an information change signal indicating a change in information to the video control portion 14 when there is a change. For example, when a TV program is programmed to be viewed with an electronic program list output from the input/output control portion 13 to the storing portion 17, the information change detecting portion 19 performs as follows. When the information change detecting portion 19, which monitors PSI/SI information that is extracted by the input/output control portion 13, receives information that was programmed to be viewed, it outputs an information change signal indicating that broadcasts of the programmed program.

When the program that was programmed to be viewed has ended, the information change detecting portion 19 outputs an information change signal indicating the program that was programmed to be viewed has ended. When an emergency warning system (EWS) has arrived, the information change detecting portion 19 may output an information change signal indicating that EWS has arrived, or when text captions data has arrived, the information change detecting portion 19 may output an information change signal indicating that text captions data has arrived. Furthermore, when a call has arrived, the information change detecting portion 19 may output an information change signal indicating that a call has arrived, or when a mail has arrived, the information change detecting portion 19 may output an information change signal indicating that a mail has arrived. Alternatively, the information change detecting portion 19 may output an information change signal indicating alarm/schedule time, depending on the alarm/schedule setting time.

A display information list is stored in the storing portion 17, similarly to the first embodiment. The display information list is updated in response to a change in information input to the input/output control portion 13. Hereinafter, a first example in which the display information list is updated will be described with reference to FIGS. 9A and 9B. FIGS. 9A and 9B are diagrams showing the first example of the display information list stored and updated in the storing portion 17, and show display information lists before and after an update in accordance with a change in information.

In FIGS. 9A and 9B, the display flag and the first display portion selection flag corresponding to each of various display information items are described in the display information list, as in the first embodiment. These flags are the same as those in the first embodiment, so that they are not described in detail. In FIGS. 9A and 9B, as the display information, "EPG", "TV image", "TV operation" and "mail edit" are described. In FIG. 9A, the display flag "ON" is described for the display information "mail edit", and the first display portion selection flag "ON" is described for the display information "TV image" and "TV operation". In FIG. 9B, the display flag "ON" is described for the display information "TV image" and "mail edit", and the first display portion selection flag "ON" is described for the display information "TV image" and "TV operation". In other words, the display information list shown in FIG. 9B is different from the display information list shown in FIG. 9A in that the display information "TV image" is added to the display information items to be displayed.

Figure 10B:
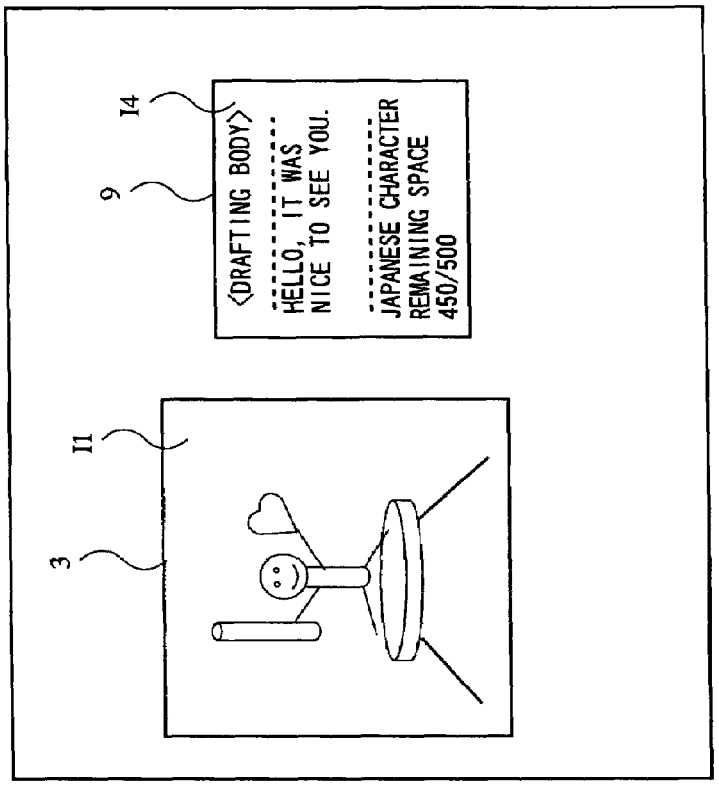
FIGS. 10A and 10B are diagrams showing an example of display layouts of a first display portion 3 and a second display portion 9, based on the display information list of FIG. 9.
Figure 10A:
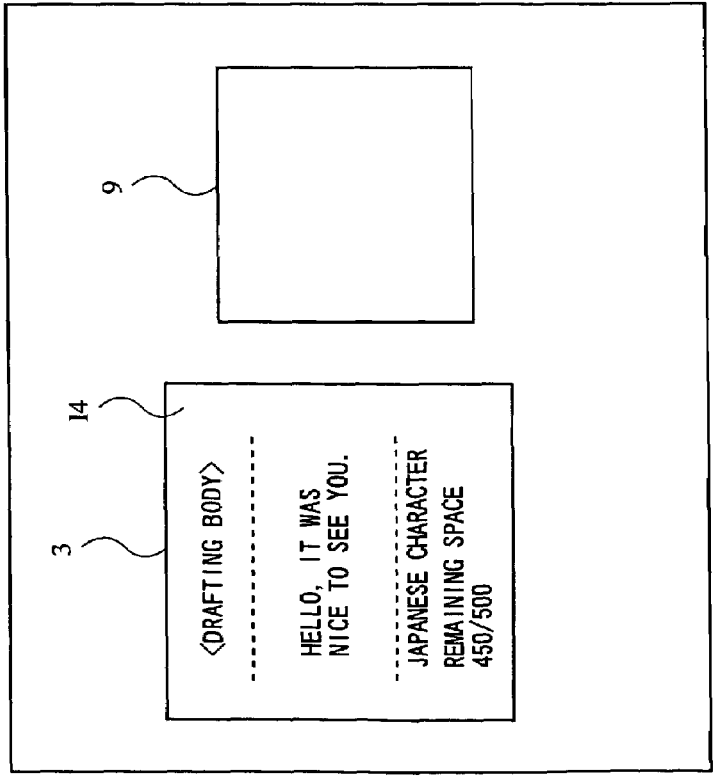

The video control portion 14 changes the layout in which various data input from the input/output control portion 13 or the storing portion 17 are displayed in the first display portion 3 and the second display portion 9, based on the information change signal output from the information change detecting portion 19 and the display information list stored in the storing portion 17. FIG. 10A is a diagram showing an example of a display layout of each of the first display portion 3 and the second display portion 9, based on the display information list described with reference to FIG. 9A. FIG. 10B is a diagram showing an example of a display layout of each of the first display portion 3 and the second display portion 9, based on the display information list described with reference to FIG. 9B.

In FIG. 10A, the video control portion 14 lays out and displays the display information whose display flag is "ON" in the first display portion 3 or the second display portion 9, based on the display information. In the display information list shown in FIG. 9A, the display flag "ON" is described only for the display information "mail edit", so that the video control portion 14 displays a mail edit screen I4 in a single display layout in the first display portion 3, and the video control portion 14 displays no information in the second display portion 9.

In FIG. 10B, when the video control portion 14 receives an information change signal indicating broadcasts of a program programmed to be viewed that is output from the information change detecting portion 19, then the video control portion 14 lays out and displays the display information whose display flag is "ON" in the first display portion 3 or the second display portion 9, based on the updated display information list. In the display information list shown in FIG. 9B, the display flag "ON" is described for the display information "TV image" and "mail edit", and the first display portion selection flag "ON" is described for "TV image" and "TV operation". Therefore, the video control portion 14 displays a TV image I1 in a single display layout in the first display portion 3, and displays a mail edit screen I4 in a single display layout in the second display portion 9.

Next, referring to FIGS. 11A and 11B, a second example in which the display information list is updated will be described. FIGS. 11A and 11B are diagrams showing the second example of the display information list stored and updated in the storing portion 17, and show display information lists before and after an update in accordance with a change in information.

In FIGS. 11A and 11B, the display flag and the first display portion selection flag corresponding to each of various display information items are described in the display information list, as in the first embodiment. These flags are the same as those in the first embodiment, so that they are not described in detail. In FIGS. 11A and 11B, as the display information, "EPG", "TV image", "TV operation" and "mail edit" are described. In FIG. 1A, the display flag "ON" is described for the display information "mail edit", and the first display portion selection flag "ON" is described for the display information "mail edit". In FIG. 11B, the display flag "ON" is described for the display information "TV image" and "mail edit", and the first display portion selection flag "ON" is described for the display information "mail edit". In other words, the display information list shown in FIG. 11B is different from the display information list shown in FIG. 11A in that the display information "TV image" is added to the display information items to be displayed.

FIG. 12A is a diagram showing an example of a display layout of each of the first display portion 3 and the second display portion 9, based on the display information list described with reference to FIG. 11A. FIG. 12B is a diagram showing an example of a display layout of each of the first display portion 3 and the second display portion 9, based on the display information list described with reference to FIG. 11B.

In FIG. 12A, the video control portion 14 lays out and displays the display information whose display flag is "ON" in the first display portion 3 or the second display portion 9, based on the display information. In the display information list shown in FIG. 11A, the display flag "ON" is described only for the display information "mail edit", so that the video control portion 14 displays a mail edit screen I4 in a single display layout in the first display portion 3, and the video control portion 14 displays no information in the second display portion 9.

In FIG. 12B, when the video control portion 14 receives an information change signal indicating broadcasts of a program programmed to be viewed that is output from the information change detecting portion 19, then the video control portion 14 lays out and displays the display information whose display flag is "ON" in the first display portion 3 or the second display portion 9, based on the updated display information list. In the display information list shown in FIG. 11B, the display flag "ON" is described for the display information TV image" and "mail edit", and the first display portion selection flag "ON" is described for "mail edit". Therefore, the video control portion 14 displays a mail edit screen I4 in a single display layout in the first display portion, and displays TV image I1 in a single display layout in the second display portion 9.

As evident from a comparison between FIGS. 10B and 12B, in the portable information terminal device 1c, the display information that is added anew as display information to be displayed ("TV image" in this embodiment) is not always displayed in the same display portion, but the display information is laid out based on the first display portion selection flag that is set in the display information list. Thus, in the portable information terminal device 1c, the display layout is automatically switched when a display information change occurs, and an interface that is easy to grasp without placing a burden on the user can be provided.

Next, referring to FIGS. 13A, 13B and 13C, a third example in which the display information list is updated will be described. FIGS. 13A, 13B and 13C are diagrams showing the third example of the display information list stored and updated in the storing portion 17, and show display information lists before and after an update in accordance with a change in information.

In FIGS. 13A, 13B and 13C, in addition to the display flag and the first display portion selection flag corresponding to each of various display information items, a display portion exclusive flag is described in the display information list. For the display portion exclusive flag, "ON" is described for display information that necessarily is displayed exclusively on the entire screen of either the first display portion 3 or the second display portion 9 of the portable information terminal device 1c (i.e., displayed necessarily in a single display layout), and "OFF" is described for display information that is not necessarily exclusively displayed.

In FIGS. 13A, 13B and 13C, as the display information, "ringing", "EPG", "TV image", "text captions", "call received-notification" and "mail edit" are described. In FIG. 13A, the display flag "ON" is described for the display information "EPG", "TV image" and "text captions", the first display portion selection flag "ON" is described for the display information "ringing", "TV image", "text captions" and "call received-notification", and the display portion exclusive flag "ON" is described for the display information "ringing". In FIG. 13B, the display flag "ON" is described for the display information "ringing", "EPG", "TV image" and "text captions", the first display portion selection flag "ON" is described for the display information "ringing", "TV image", "text captions" and "call received-notification", and the display portion exclusive flag "ON" is described for the display information "ringing". In FIG. 13C, the display flag "ON" is described for the display information "EPG", "TV image", "text captions" and "call received-notification", the first display portion selection flag "ON" is described for the display information "ringing", "TV image", "text captions" and "call received-notification", and the display portion exclusive flag "ON" is described for the display information "ringing". In other words, the display information list shown in FIG. 13B is different from the display information list shown in FIG. 13A in that the display information "ringing" is added to the display information items to be displayed. The display information list shown in FIG. 13C is different from the display information list shown in FIG. 13B in that the display information "ringing" is deleted from the display information items to be displayed, and the display information "call received-notification" is added thereto.

Figure 14A:
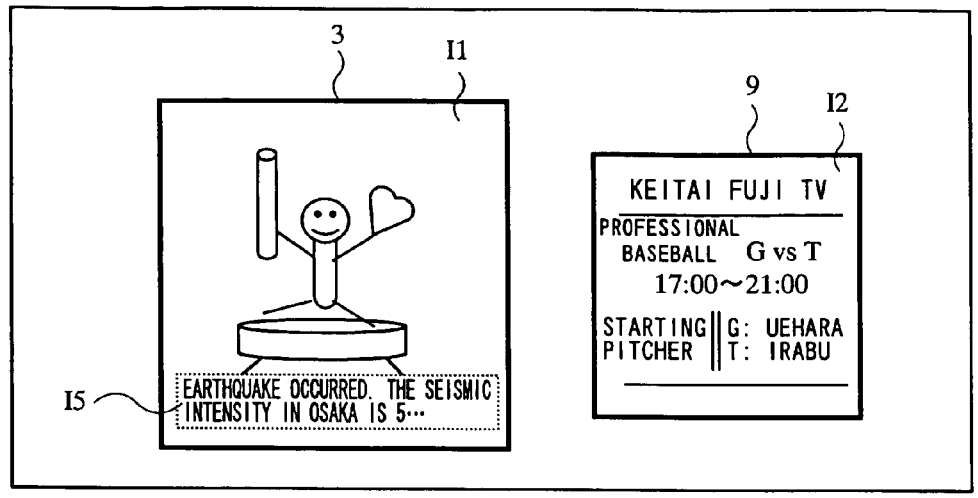
FIGS. 14A, 14B and 14C are diagrams showing an example of display layouts of a first display portion 3 and a second display portion 9, based on the display information list of FIG. 13.
Figure 14B:
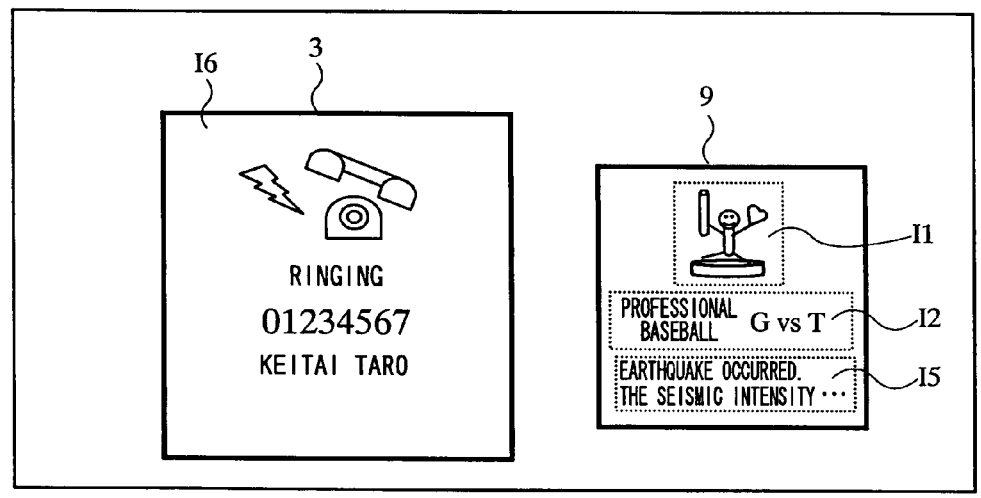
Figure 14C:
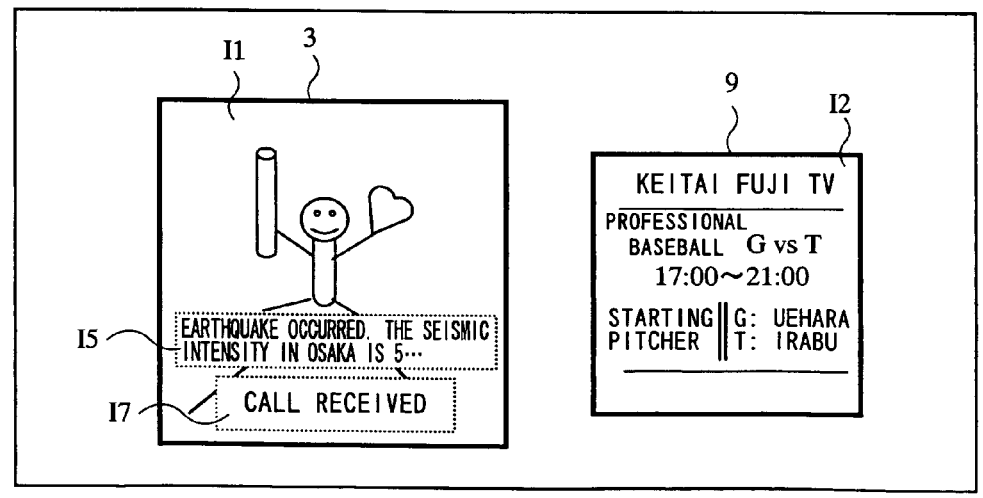

FIG. 14A is a diagram showing an example of a display layout of each of the first display portion 3 and the second display portion 9, based on the display information list described with reference to FIG. 13A. FIG. 14B is a diagram showing an example of a display layout of each of the first display portion 3 and the second display portion 9, based on the display information list described with reference to FIG. 13B. FIG. 14C is a diagram showing an example of a display layout of each of the first display portion 3 and the second display portion 9, based on the display information list described with reference to FIG. 13C.

In FIG. 14A, the video control portion 14 lays out and displays the display information whose display flag is "ON" in the first display portion 3 or second display portion 9, based on the display information list. In the display information list shown in FIG. 13A, the display flag "ON" is described for the display information "EPG", "TV image" and "text captions", and the first display portion selection flag "ON" is described for the display information "ringing", "TV image", "text captions" and "call received-notification". Therefore, the video control portion 14 displays a TV image I1 and text captions information I5 in a plural display layout in the first display portion 3, and the video control portion 14 displays EPG I2 in a single display layout in the second display portion 9.

In FIG. 14B, the video control portion 14 lays out and displays the display information whose display flag is "ON" in response to an information change signal indicating that call is received in the first display portion 3 or the second display portion 9, based on the display information list. In the display information list shown in FIG. 13B, the display flag "ON" is described for the display information "ringing", "EPG", "TV image" and "text captions", the first display portion selection flag "ON" is described for the display information "ringing", "TV image", "text captions" and "call received-notification", and the display portion exclusive flag "ON" is described for the display information "ringing". Therefore, the video control portion 14 displays information of call received I6 in a single display layout in the first display portion 3, and the video control portion 14 displays a TV image I1, EPG I2 and text captions information I5 in a plural display layout in the second display portion 9.

Thus, when displaying display information whose display portion exclusive flag is "ON", the display information is displayed exclusively in the display portion corresponding to the first display portion selection flag. By switching in the above-described manner, the display layout is automatically switched in response to addition of display information when multiple pieces of information are displayed, without compromising the information that already has been displayed, and an interface that is easy to grasp without placing a burden on the user can be provided.

In FIG. 14C, the video control portion 14 lays out and displays the display information whose display flag is "ON" in response to an information change signal indicating that ringing has ended and call received-notification is added in the first display portion 3 or the second display portion 9, based on the display information list. In the display information list shown in FIG. 13C, the display flag "ON" is described for the display information "EPG", "TV image", "text captions" and "call received-notification", and the first display portion selection flag "ON" is described for the display information "ringing", "TV image", "text captions" and "call received-notification". Therefore, the video control portion 14 displays a TV image I1, text captions information I5, and call received-notification information I7 in a plural display layout in the first display portion 3, and the video control portion 14 displays EPG I2 in a single display layout in the second display portion 9. By switching in such a manner as shown in FIG. 14C, the display layout is automatically switched again in response to deletion of display information when multiple pieces of information are displayed, and an interface that is easy to grasp without placing a burden on the user can be provided.

Figure 15:
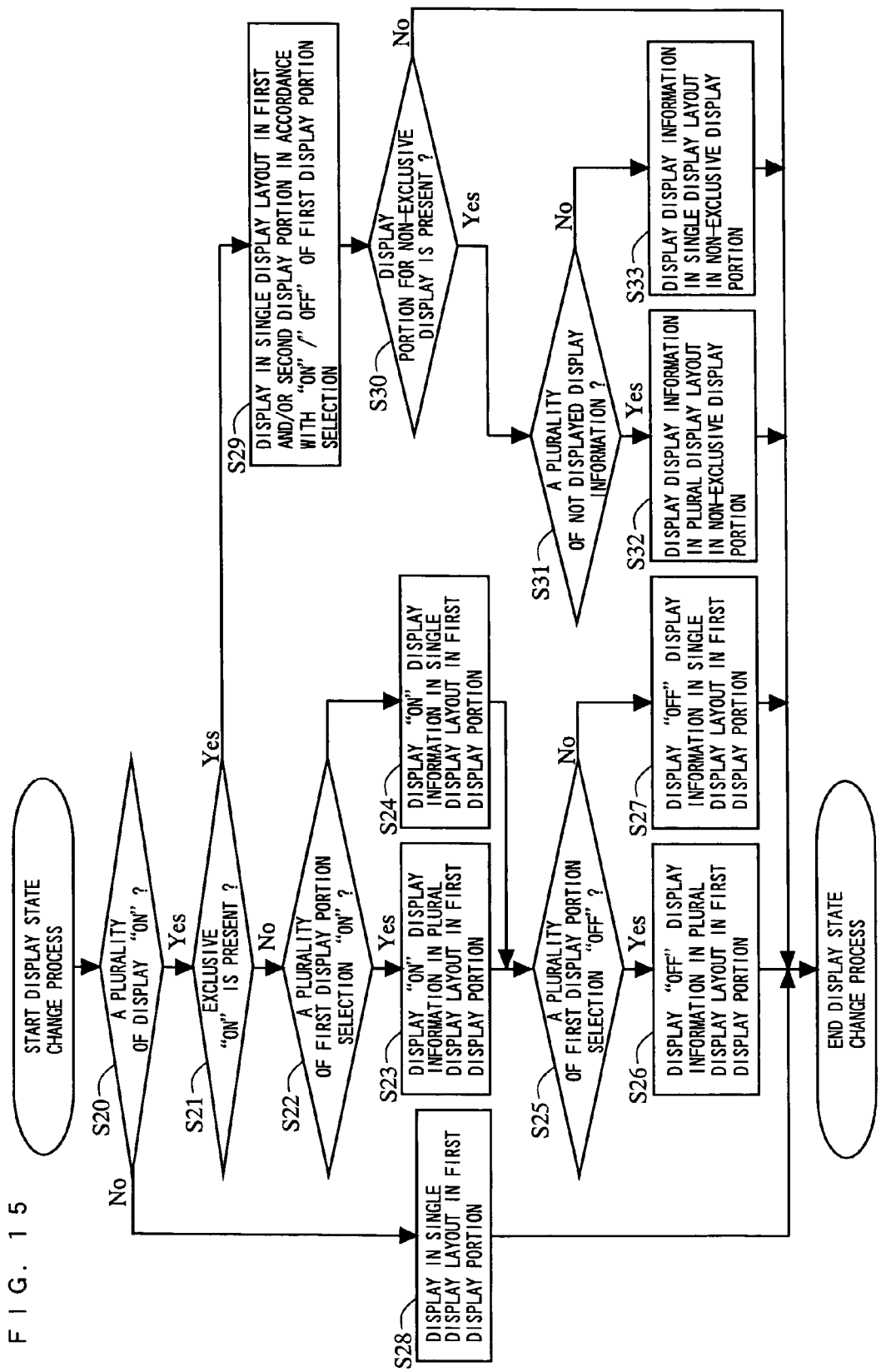
FIG. 15 is a flowchart showing a display state change process that is performed by a video control portion 14 of FIG. 8.

Hereinafter, the operation of the display state change process performed by the video control portion 14 will be described with reference to FIG. 15. FIG. 15 is a flowchart showing a display state change process that is performed by the video control portion 14. The display state change process that is performed by the video control portion 14 is started in response to an information change signal output from the information change detecting portion 19.

In FIG. 15, the video control portion 14 searches the display information list stored in the storing portion 17 and determines whether or not the display flag "ON" is described for a plurality of display information items (step S20). Then, the video control portion 14 moves the process to the next step S21 when the display flag "ON" is described for a plurality of display information items. On the other hand, the video control portion 14 moves the process to the next step S28 when the display flag "ON" is not described for a plurality of display information items.

In the step S21, the video control portion 14 searches for display information whose display flag is "ON" from the display information list stored in the storing portion 17 and determines regarding the display information whether or not there is display information whose display portion exclusive flag is "ON". Then, when there is no display portion exclusive flag "ON", the video control portion 14 moves the process to the next step S22. On the other hand, when there is a display portion exclusive flag "ON", the video control portion 14 moves the process to the next step S29.

The processes of steps S22 to S28 are the same as those of steps S12 to S18 described with reference to FIG. 7 in the first embodiment. Therefore, the steps S22 to S27 are not described in detail. As in the steps S16 to S18 in FIG. 7, after the end of the steps S26 to S28, the video control portion 14 ends the processes according to the flowchart.

On the other hand, in step S29, the video control portion 14 displays display information whose display flag is "ON" and whose display portion exclusive flag is "ON" in a single display layout, and moves the process to the next step. In this case, when the first display portion selection flag of this display information is "ON", this display information is displayed in the first display portion 3, and when the first display portion selection flag of this display information is "OFF", this display information is displayed in the second display portion 9. There may be a plurality of display information items whose display flag is "ON" and whose display portion exclusive flag is "ON". In this case, when these display information items have the same first display portion selection flag, the display information item whose display flag is updated to "ON" later can be displayed by priority (the last display flog "ON" wins). When these display information items have different first display portion selection flags, the display information items can be displayed separately and exclusively in the first display portion 3 and the second display portion 9.

Next, the video control portion 14 determines whether or not there is a display portion that is not exclusively displayed in step S29 (step S30). When there is a non-excusive display portion, the video control portion 14 moves the process to the next step S31. On the other hand, when all the display portions are used for exclusive display, the video control portion 14 ends the process according to the flowchart.

In step S31, the video control portion 14 searches for display information whose display flag is "ON" from the display information list stored in the storing portion 17 and determines regarding the display information whether or not there are a plurality of display information items that are neither displayed in the first display portion 3 or the second display portion 9. Then, when there are a plurality of display information items that not displayed, the video control portion 14 displays the display information items that are not displayed in a plural display layout in the display portion that is not used for exclusive display (step S32) and ends the process according to the flowchart. On the other hand, when there are not a plurality of display information items that are not displayed, the video control portion 14 displays the display information in a single display layout in a non-exclusive display portion (step S33) and ends the process according to the flowchart. In step S33, when there is no display information that is not displayed, the video control portion 14 displays no information in a non-exclusive display portion.

Thus, according to the portable information terminal device of the second embodiment, the display layouts of a plurality of display portions are switched automatically, in response to a change in information to be displayed, and a plurality of information items can be displayed in an appropriate layout that is easy to grasp to the user.

The information item on the screen that is exclusively displayed in the first display portion 3 or the second display portion 9 may be an operation screen that presents the operation content in the portable information terminal device 1c to the user. For example, the operation screen is automatically displayed exclusively in the first display portion 3 by the user operating the operation key set 4. Furthermore, the setting of the flags of the display information list may be changed so as to change the display layout by the user operating the operation key set 4. Hereinafter, a fourth example of in which the display information list is updated by the operation with the operation key set 4 as described above will be described with reference to FIGS. 16A and 16B. FIGS. 16A and 16B are diagrams showing the fourth example of the display information list stored and updated in the storing portion 17, and show a display information list that is updated in response to a change in information.

In FIGS. 16A and 16B, the display flag, the first display portion selection flag, and the display portion exclusive flag corresponding to each of various display information items are described in the display information list, as in FIGS. 13A and 13B. These flags are the same as those in the first embodiment and FIGS. 13A and 13B, so that they are not described in detail. In FIGS. 16A and 16B, as the display information, "operation screen", "EPG", "TV image", "subtitles", "communication contents link" and "communication contents" are described. In FIG. 16A, the display flag "ON" is described for the display information "operation screen", "EPG", "TV image" and "subtitles", the first display portion selection flag "ON" is described for the display information "operation screen", and the display portion exclusive flag "ON" is described for the display information "operation screen". In FIG. 16B, the display flag "ON" is described for the display information "EPG", "TV image" and "subtitles", the first display portion selection flag "ON" is described for the display information "operation screen", "TV image" and "subtitles", and the display portion exclusive flag "ON" is described for the display information "operation screen". In other words, the display information list shown in FIG. 16B is different from the display information list shown in FIG. 16A in that the display information "operation screen" is deleted from the display information items to be displayed, and that the first display portion selection flags of the "TV image" and "subtitles" are changed to "ON".

Figure 17A:
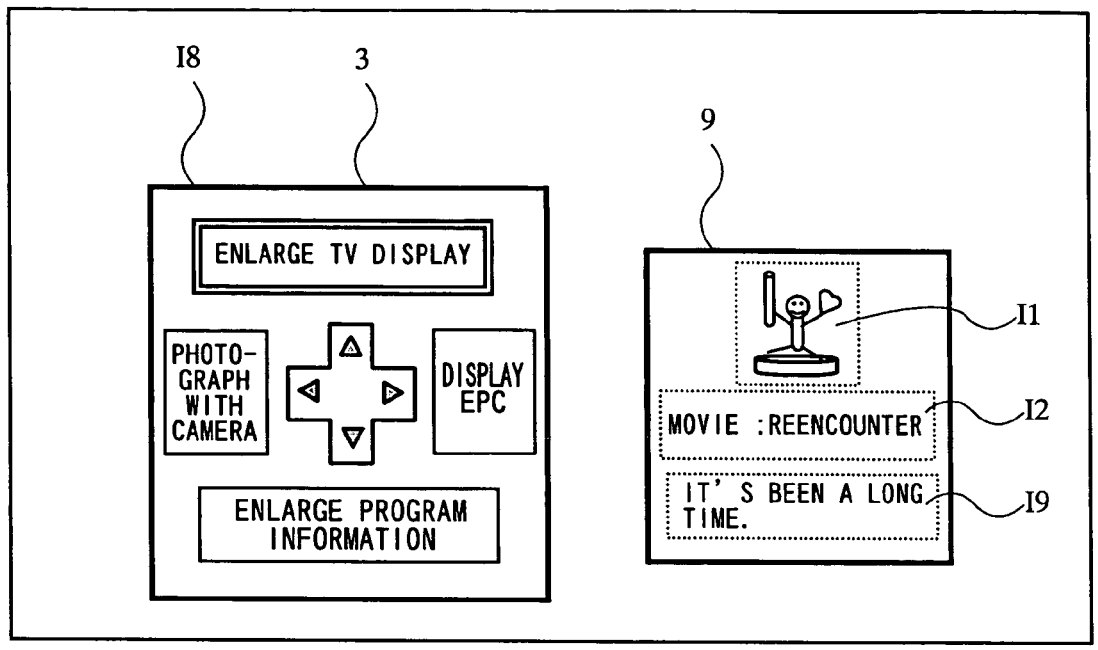
FIGS. 17A and 17B are diagrams showing an example of display layouts of a first display portion 3 and a second display portion 9, based on the display information list of FIG. 16.
Figure 17B:
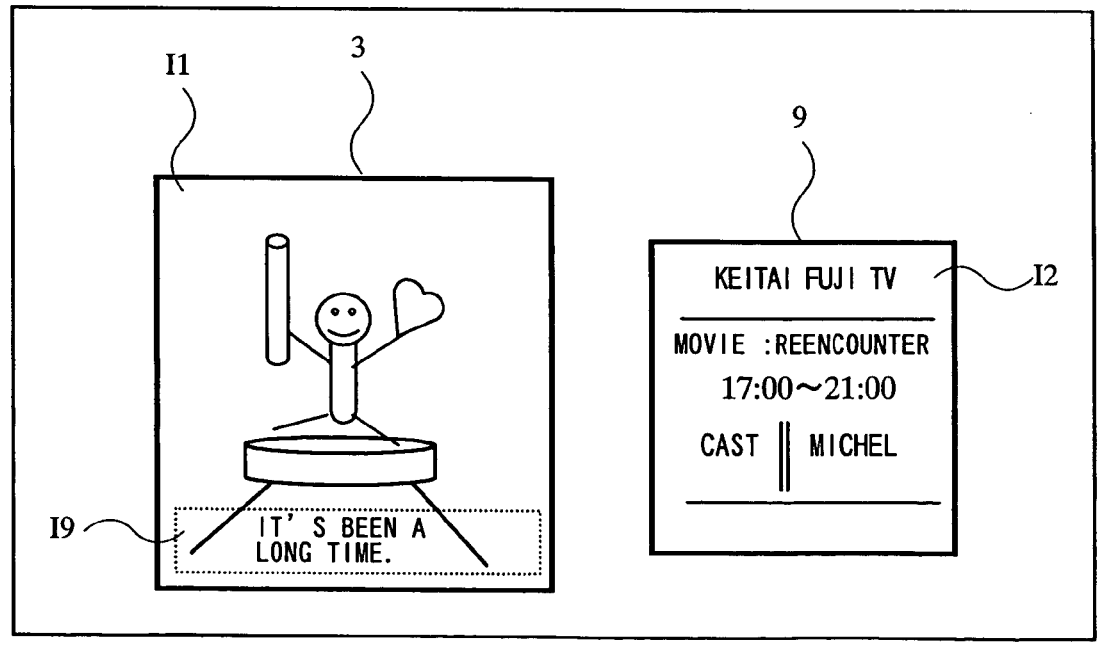

FIG. 17A is a diagram showing an example of a display layout of each of the first display portion 3 and the second display portion 9, based on the display information list described with reference to FIG. 16A. FIG. 17B is a diagram showing an example of a display layout of each of the first display portion 3 and the second display portion 9, based on the display information list described with reference to FIG. 16B.

In FIG. 17A, when the video control portion 14 receives an information change signal indicating an operation signal that is output from the information change detecting portion 19, then the video control portion 14 lays out and displays the display information whose display flag is "ON" in the first display portion 3 or the second display portion 9, based on the display information list. In the display information list shown in FIG. 16A, the display flag "ON" is described for the display information "operation screen", "EPG", "TV image" and "subtitles", the first display portion selection flag "ON" is described for "operation screen", and the display portion exclusive flag "ON" is described for "operation screen". Therefore, the video control portion 14 displays an operation screen I8 in a single display layout in the first display portion 3, and displays a TV image I1, EPG I2, and subtitles I9 in a plural display layout in the second display portion 9. Then, while watching the operation screen I8 that is displayed exclusively in the first display portion 3, the user of the portable information terminal device 1c selects the display information to be displayed by priority in the first display portion 3, and thus "TV image" and "subtitles" are selected.

In FIG. 17B, when the video control portion 14 receives an information change signal indicating that a predetermined time has passed since an operation signal output from the information change detecting portion 19 turned off, then the video control portion 14 lays out and displays the display information whose display flag is "ON" in the first display portion 3 or the second display portion 9, based on the updated display information list. In the display information list shown in FIG. 16B, the display flag "ON" is described for the display information "EPG", "TV image" and "subtitles", and the first display portion selection flag "ON" is described for "operation screen", "TV image" and "subtitles". Therefore, the video control portion 14 displays a TV image I1 and subtitles I9 in a plural display layout in the first display portion 3, and the video control portion 14 displays EPG I2 in a single display layout in the second display portion 9. In this case, the operation screen I8 automatically becomes out of the display after a predetermined time has passed, as described above. Thus, the display layout is automatically switched when a display information movement is requested, and an interface that is easy to grasp without placing a burden on the user can be provided.

The information item on the screen that is displayed exclusively in the first display portion 3 or the second display portion 9 may be communication contents information received by selecting the link to communication contents. Hereinafter, a fifth example of in which the display information list is updated by selecting the link will be described with reference to FIGS. 18A and 18B. FIGS. 18A and 18B are diagrams showing the fifth example of the display information list stored and updated in the storing portion 17, and show a display information list that is updated in response to a change in information.

In FIGS. 18A and 18B, the display flag, the first display portion selection flag, and the display portion exclusive flag corresponding to each of various display information items are described in the display information list, as in FIGS. 13A and 13B. These flags are the same as those in the first embodiment and FIGS. 13A and 13B, so that they are not described in detail. In FIGS. 18A and 18B, as the display information, "operation screen", "EPG", "TV image", "subtitles", "communication contents link" and "communication contents" are described. In FIG. 18A, the display flag "ON" is described for the display information "TV image" and "communication contents link", the first display portion selection flag "ON" is described for the display information "operation screen", "TVimage", "subtitles" and "communication contents link", and the display portion exclusive flag "ON" is described for the display information "operation screen" and "communication contents link". In FIG. 18B, the display flag "ON" is described for the display information "TV image" and "communication contents", the first display portion selection flag "ON" is described for the display information "operation screen", "TV image", "subtitles", and "communication contents link", the display portion exclusive flag "ON" is described for the display information "operation screen" and "communication contents". In other words, the display information list shown in FIG. 18B is different from the display information list shown in FIG. 18A in that the display information "communication contents link" is deleted from the display information items to be displayed, and that "communication contents" is added to the display information items to be displayed.

Figure 19A:
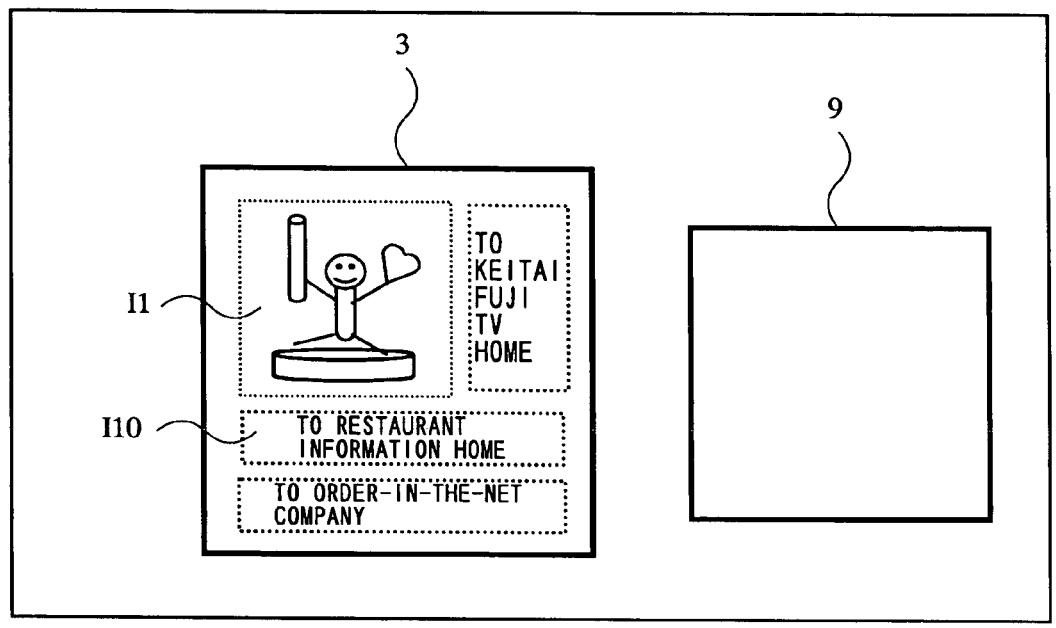
FIGS. 19A and 19B are diagrams showing an example of display layouts of a first display portion 3 and a second display portion 9, based on the display information list of FIG. 18.
Figure 19B:
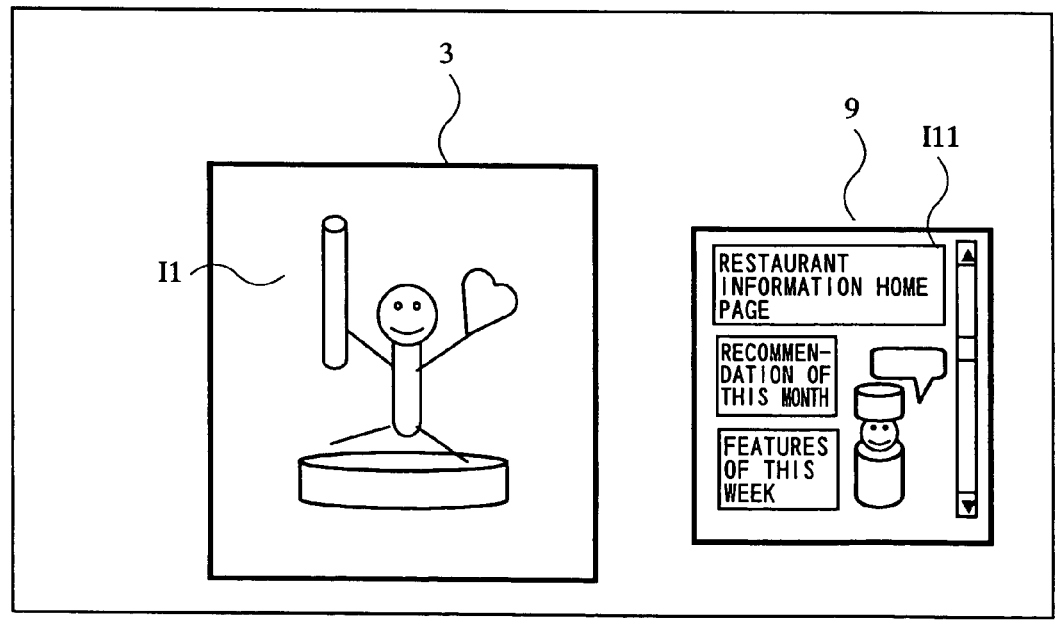

FIG. 19A is a diagram showing an example of a display layout of each of the first display portion 3 and the second display portion 9, based on the display information list described with reference to FIG. 18A. FIG. 19B is a diagram showing an example of a display layout of each of the first display portion 3 and the second display portion 9, based on the display information list described with reference to FIG. 18B.

In FIG. 19A, the video control portion 14 lays out and displays the display information whose display flag is "ON" in the first display portion 3 or the second display portion 9, based on the updated display information list. In the display information list shown in FIG. 18A, the display flag "ON" is described for the display information "TV image" and "communication contents link", and the first display portion selection flag "ON" is described for "TV image" and "communication contents link". Therefore, the video control portion 14 displays a TV image I1 and a communication contents link information I10 in a plural display layout in the first display portion 3, and the video control portion 14 displays no information in the second display portion 9. Then, the user of the portable information terminal device 1c selects the communication contents link information I10 displayed in the first display portion 3 so as to have communication contents information that is linked to the communication contents link information I10 displayed.

In FIG. 19B, when the video control portion 14 receives an information change signal indicating communication contents information that is output from the information change detecting portion 19, then the video control portion 14 lays out and displays the display information whose display flag is "ON" in the first display portion 3 or the second display portion 9, based on the display information list. In the display information list shown in FIG. 18B, the display flag "ON" is described for the display information "TV image" and "communication contents", and the first display portion selection flag "ON" is described for "TV image". Therefore, the video control portion 14 displays a TV image I1 in a single display layout in the first display portion 3, and the video control portion 14 displays communication contents information I11 in a single display layout in the second display portion 9. Thus, the display layout is automatically switched when linked display information is requested to be added, and an interface that is easy to grasp without placing a burden on the user can be provided.

The second embodiment has been described, using an example where the portable information terminal device 1c has a configuration in which the first display portion 3 and the second display portion 9 are constantly visible from the user. However, the portable information terminal device 1c may have a configuration in which the second display portion 9 is operated so as to become visible or not visible as described with reference to FIGS. 1 to 3. In this case, if the step S11 of FIG. 7 is performed after the step S20 of FIG. 15, and when the step S11 is "Yes", the process moves to the step S21 of FIG. 15, then the display state change process having both the advantages of the first and the second embodiments can be performed.

Third Embodiment

Hereinafter, a portable information terminal device according to a third embodiment of the present invention will be described with reference to the accompanying drawings. In the first embodiment, an example in which the display layout is switched automatically depending on the visibility status of a plurality of display portions has been described. In the second embodiment, an example in which the display layout is switched automatically depending on a change in information to be displayed has been described. In the third embodiment, a priority is given for each information item to be displayed, and the display layout is switched automatically in accordance with the priority. When the portable information terminal device is applied to a mobile telephone or similar equipment, the portable information terminal device may have a configuration in which the second display portion 9 is operated so as to become visible or not visible as shown in FIGS. 1 to 3 or a configuration in which the first display portion 3 and the second display portion 9 are constantly visible from the user. The first display portion 3 and the second display portion 9 may be configured both with LCD, or they may be configured with different display systems, for example, LCD and organic EL (electroluminescent). Alternatively, the display portions may be configured with other display systems such as electronic paper and polysilicon liquid crystal, with LCD with or without a backlight, with systems in which the displays are controlled with different voltages. Hereinafter, this embodiment will be described, taking an example in which the portable information terminal device has a configuration in which the first display portion 3 and the second display portion 9 are constantly visible from the user.

Figure 20:
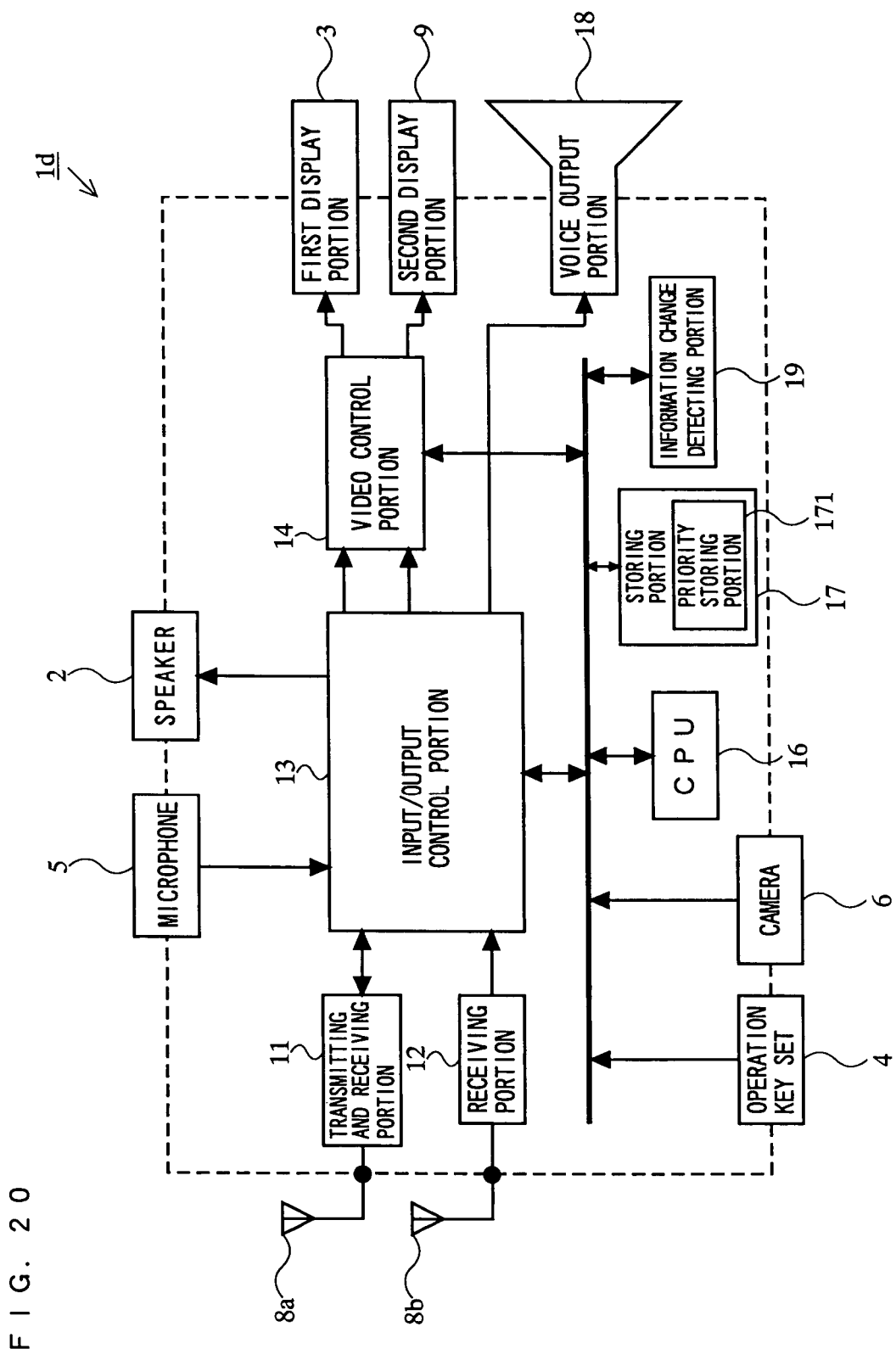
FIG. 20 is a block diagram showing the internal configuration of a portable information terminal device 1d according to a third embodiment of the present invention.

Referring to FIG. 20, the internal configuration of a portable information terminal device 1d of the third embodiment will be described. FIG. 20 is a block diagram showing the internal configuration of the portable information terminal device 1d. The portable information terminal device 1d has a configuration in which a priority storing portion 171 is added to the inside of the storing portion 17 of the portable information terminal device 1c described in the second embodiment, and the other components are identical. Therefore, in describing the portable information terminal device 1d, the same components as those in the first or the second embodiment bear the same reference numerals and are not described in detail.

The priority storing portion 171 stores the priority that is predetermined with respect to each display information item described in the display information list. Furthermore, as described later, since the display information having the highest priority is displayed in the display portion for which the single display layout is set, the priority storing portion 171 also stores the setting status of each of the first display portion 3 and the second display portion 9. The setting status of the display portion stored in the priority storing portion 171 can be changed by the user operating the operation key set 4. It is not necessary to provide the priority storing portion 171 storing the priority and the setting status separately from other information inside the storing portion 17, but the priority storing portion 171 can be stored as one item of the display information list. The priority storing portion 171 may be provided separately from the storing portion 17.

The video control portion 14 configures an optimal display layout according to the priority, referring to the priority and the setting status stored in the priority storing portion 171 in accordance with each information item that is input, and displays the information in the first display portion 3 and the second display portion 9.

A display information list in which a display flag is described corresponding to each of various display information items is stored in the storing portion 17. The display information list is updated in response to a change in information input to the input/output control portion 13. Hereinafter, a first example in which the display information list is updated in the portable information terminal device 1d will be described with reference to FIGS. 21A and 21B. FIGS. 21A and 21B are diagrams showing the first example of the display information list stored and updated in the storing portion 17, and show display information lists before and after an update in accordance with a change in information. For simplification, in FIGS. 21A and 21B, the priority stored in the priority storing portion 171 is stored as one item of the display information list. In FIGS. 21A and 21B, the setting status of the display portion stored in the priority storing portion 171 is also shown.

In FIGS. 21A and 21B, the display flag and the priority corresponding to each of various display information items are described in the display information list. The display information and the display flag are the same as those in the first embodiment and therefore will not be described here. The priority indicates with values the display information that is to be displayed by priority in the first display portion 3 and/or the second display portion 9 for which the single display layout is set. Then, the display information item having a large value of the priority is displayed by priority over the other display information items in the single display layout. The priority that is set for each display information item is predetermined before the display information is received, and can be changed by the user of the portable information terminal device 1d.

In FIGS. 21A and 21B, as the display information, "ringing", "alarm", "EPG", "TV image", "TV operation" and "mail received" are described. In FIG. 21A, the priority value "10" and the display flag "OFF" are described for the display information "ringing". The priority value "9" and the display flag "OFF" are described for the display information "alarm". The priority value "8" and the display flag "ON" are described for the display information "EPG". The priority value "7" and the display flag "ON" are described for the display information "TV image". The priority value "7" and the display flag "OFF" are described for the display information "TV operation". The priority value "4" and the display flag "ON" are described for the display information "mail received". In FIG. 21B, the display flag of the display information "alarm" is changed to "ON" from the display information list shown in FIG. 21A (i.e., display of the display information "alarm" is added).

Furthermore, FIGS. 21A and 21B also shows the setting status of the display portion stored by the priority storing portion 171. In both FIGS. 21A and 21B, the layout selection "plural display layout" is described for the display portion "first display portion", and the layout selection "single display layout" is described for the display portion "second display portion". In other words, in this setting status, only the second display portion 9 is set to display the display information in the single display layout. In this manner, in the setting status of the display portion stored in the priority storing portion 171, either one of the display portions is set to the single display layout, and the other display portion is set to the plural display layout. The layout selection for these display portions can be changed by the user of the portable information terminal device 1d.

Figure 22A:
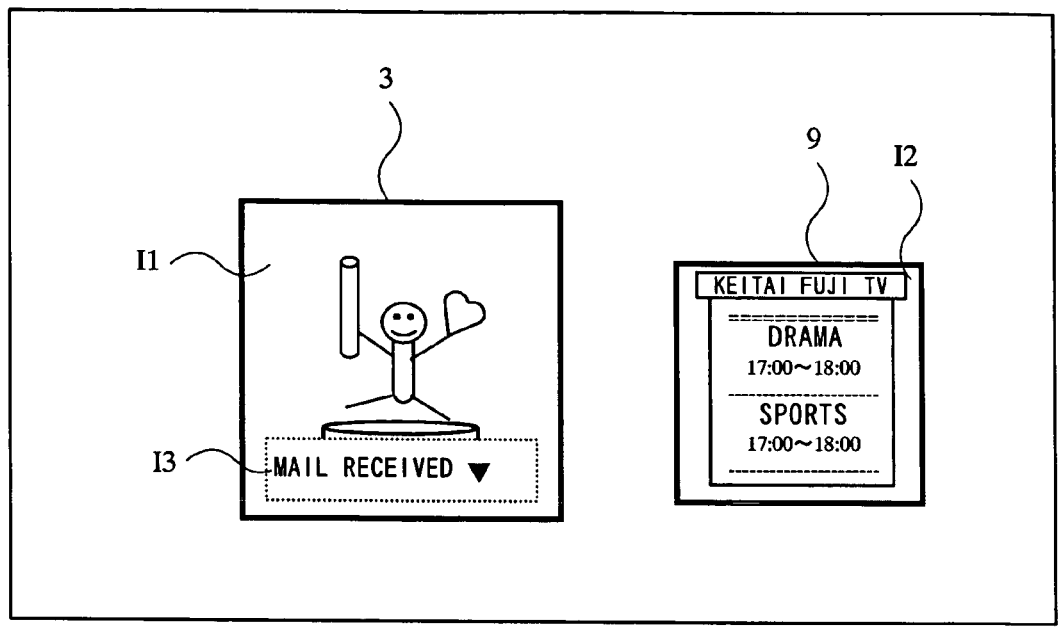
FIGS. 22A and 22B are diagrams showing an example of display layouts of a first display portion 3 and a second display portion 9, respectively, based on the display information list and the setting status of the display portion of FIG. 21.
Figure 22B:
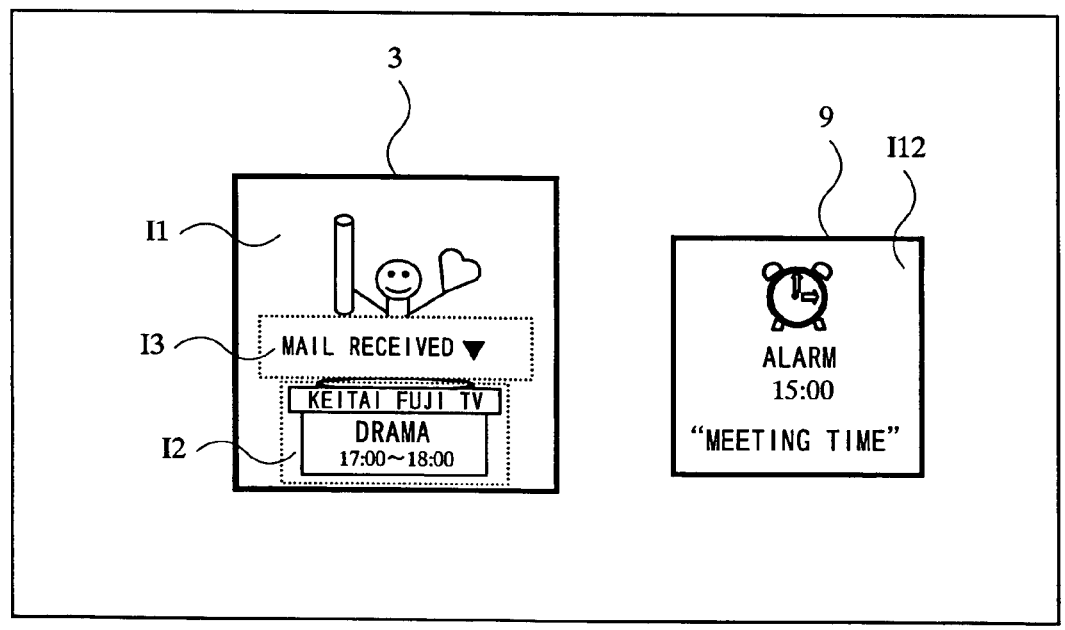

The video control portion 14 changes the layout in which various data input from the input/output control portion 13 or the storing portion 17 are displayed in the first display portion 3 and the second display portion 9, based on the information change signal output from the information change detecting portion 19, the display information list including the priority stored in the storing portion 17 and the setting status of the display portion. FIG. 22A is a diagram showing an example of a display layout of each of the first display portion 3 and the second display portion 9, based on the display information list and the setting status of the display portion described with reference to FIG. 21A. FIG. 22B is a diagram showing an example of a display layout of each of the first display portion 3 and the second display portion 9, based on the display information list and the setting status of the display portion described with reference to FIG. 21B.

In FIG. 22A, the video control portion 14 lays out and displays the display information whose display flag is "ON" in the first display portion 3 and the second display portion 9, based on the priority and the setting status of the display portion. In the display information list shown in FIG. 21A, the display flag "ON" is described for the display information "EPG", "TV image" and "mail received", and of these, the display information "EPG" has the highest priority "8". The second display portion 9 is set to the single display layout. Therefore, the video control portion 14 displays a TV image I1 and mail received information I3 in the plural display layout in the first display portion 3, and the video control portion 14 displays EPG I2 in the single display layout in the second display portion 9.

In FIG. 22B, when the video control portion 14 receives an information change signal indicating alarm information that is output from the information change detecting portion 19, then the video control portion 14 lays out and displays the display information whose display flag is "ON" in the updated display information list in the first display portion 3 or the second display portion 9, based on the priority and the setting status of the display portion. In the display information list shown in FIG. 21B, the display flag of the display information "alarm" is updated to "ON", and the highest priority "9" is described for the display information "alarm". The second display portion 9 is set to the single display layout. Therefore, the video control portion 14 displays a TV image I1, EPG I2, and mail received information I3 in the plural display layout in the first display portion 3, and the video control portion 14 displays alarm information I12 in the single display layout in the second display portion 9.

As evident from a comparison between FIGS. 22A and 22B, in the portable information terminal device 1d, the display information having the highest priority is displayed in the display portion that is set to the single display layout. For example, when display of the display information having the highest priority is added, the layout is changed to a layout in which this display information is displayed exclusively. Therefore, the user of the portable information terminal device 1d can watch the information having a high priority by priority.

Next, referring to FIGS. 23A and 23B, a second example in which the display information list in the portable information terminal device 1d is updated will be described. FIGS. 23A and 23B are diagrams showing the second example of the display information list stored and updated in the storing portion 17, and show display information lists before and after an update in accordance with a change in information. For simplification, in FIGS. 23A and 23B, as in FIGS. 21A and 21B, the priority stored by the priority storing portion 171 is stored as one item of the display information list. Furthermore, FIGS. 23A and 23B also show the setting status of the display portions stored in the priority storing portion 171.

In FIGS. 23A and 23B, the display flag and the priority corresponding to each of various display information items are described in the display information list. This is the same as in FIGS. 21A and 21B, so that they are not described in detail. In FIGS. 23A and 23B, as the display information, "ringing", "alarm", "EPG", "TV image", "TV operation" and "mail received" are described. In FIG. 23A, the display flag and the priority described in the display information list are the same as those in FIG. 21A, so that they are not described in detail. In FIG. 23B, the display flag of the display information "TV operation" in the display information list of FIG. 23A is updated to be "ON" (i.e., display of the display information "TV operation" is added). Furthermore, FIGS. 23A and 23B also shows the setting status of the display portions stored by the priority storing portion 171, but they are the same as those in FIGS. 21A and 21B, so that detailed description thereof is omitted.

Figure 24A:
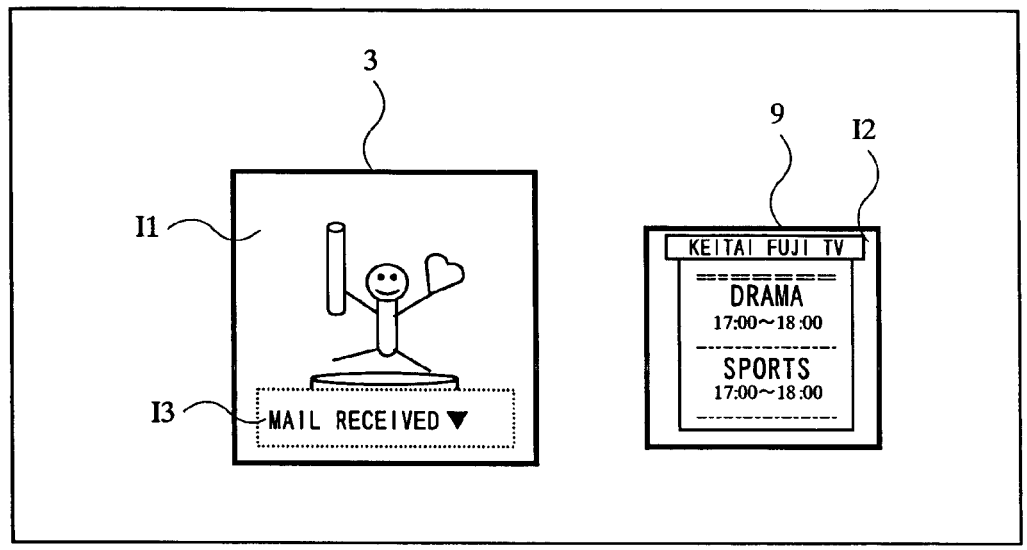
FIGS. 24A and 24B are diagrams showing an example of display layouts of a first display portion 3 and a second display portion 9, based on the display information list and the setting status of the display portion of FIG. 23.
Figure 24B:
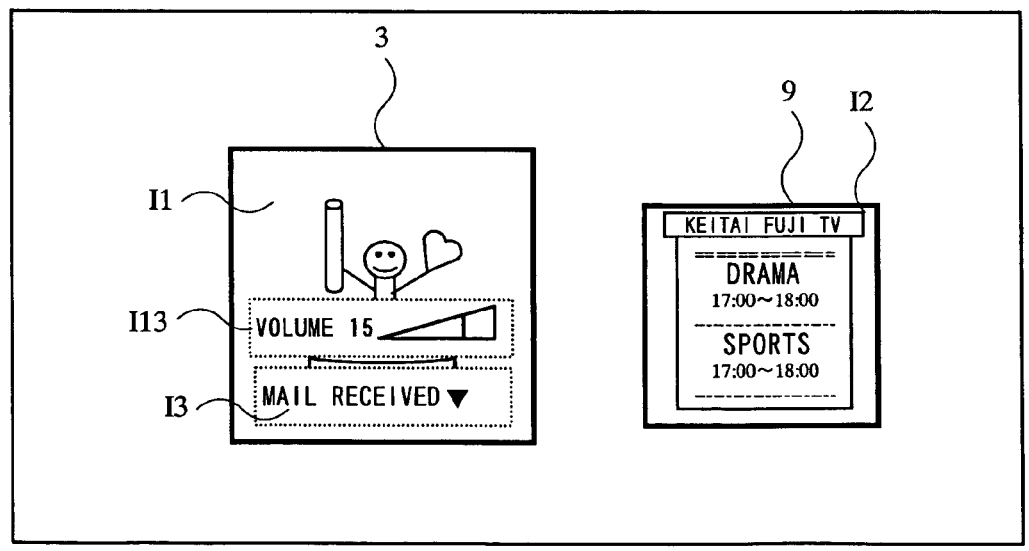

The video control portion 14 changes the layout in which various data input from the input/output control portion 13 or the storing portion 17 are displayed in the first display portion 3 and the second display portion 9, based on the information change signal output from the information change detecting portion 19, the display information list including the priority stored in the storing portion 17 and the setting status of the display portion. FIG. 24A is a diagram showing an example of a display layout of each of the first display portion 3 and the second display portion 9, based on the display information list and the setting status of the display portion described with reference to FIG. 23A. FIG. 24B is a diagram showing an example of a display layout of each of the first display portion 3 and the second display portion 9, based on the display information list and the setting status of the display portion described with reference to FIG. 23B.

In FIG. 24A, the video control portion 14 lays out and displays the display information whose display flag is "ON" in the first display portion 3 or the second display portion 9, based on the priority and the setting status of the display portion. In the display information list shown in FIG. 23A, the display flag "ON" is described for the display information "EPG", "TV image" and "mail received", and of these, the display information "EPG" has the highest priority "8". The second display portion 9 is set to the single display layout. Therefore, the video control portion 14 displays a TV image I1 and mail received information I3 in the plural display layout in the first display portion 3, and the video control portion 14 displays EPG I2 in the single display layout in the second display portion 9.

In FIG. 24B, when the video control portion 14 receives an information change signal indicating TV operation information that is output from the information change detecting portion 19, then the video control portion 14 lays out and displays the display information whose display flag is "ON" in the updated display information list in the first display portion 3 or the second display portion 9, based on the priority and the setting status of the display portion. In the display information list shown in FIG. 23B, the display flag of display information "TV operation" is updated to "ON", but the display information having the highest priority is unchanged and is the display information "EPG". The second display portion 9 is set to the single display layout. Therefore, the video control portion 14 displays a TV image I1, mail received information I3 and TV operation information I13 in the plural display layout in the first display portion 3, and the video control portion 14 displays EPG I2 in the single display layout in the second display portion 9.

As evident from a comparison between FIGS. 24A and 24B, in the portable information terminal device 1*d*, the display information having the highest priority is displayed in the display portion that is set to the signal display layout. However, when display of display information having a low priority is added, the display information having the highest priority continues to be displayed exclusively in the same display portion. Therefore, the user of the portable information terminal device 1*d* can always watch the information having a high priority by priority.

Figure 25:
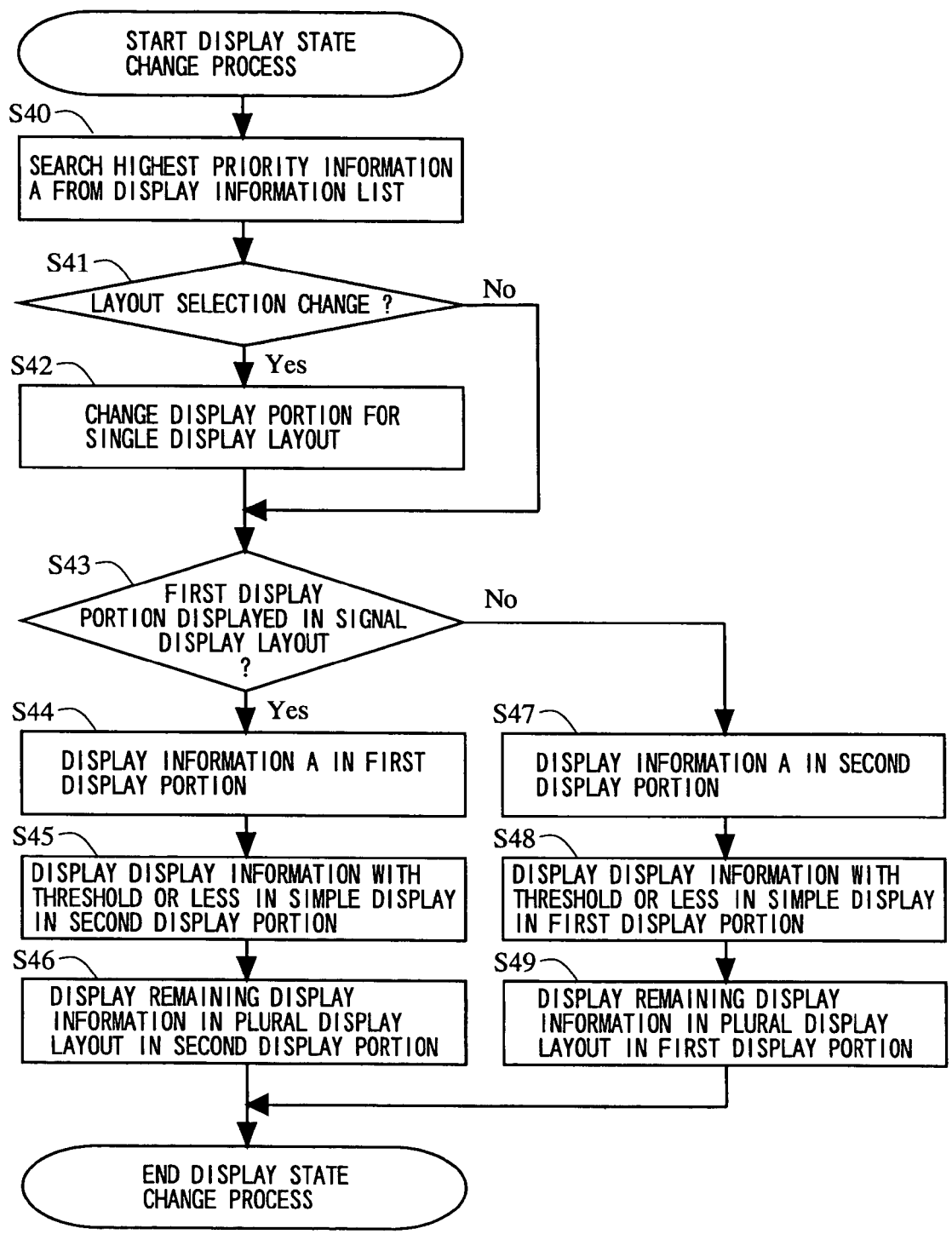
FIG. 25 is a flowchart showing a display state change process that is performed by a video control portion 14 of FIG. 20.

Hereinafter, the operation of the display state change process performed by the video control portion 14 of the portable information terminal device 1*d* will be described with reference to FIG. 25. FIG. 25 is a flowchart showing a display state change process that is performed by the video control portion 14. The display state change process that is performed by the video control portion 14 is started in response to an information change signal output from the information change detecting portion 19.

In FIG. 25, the video control portion 14 searches the display information list stored in the storing portion 17 for display information having the highest priority of the display information whose display flag is "ON" (step S40). Hereinafter, the display information having the highest priority that is searched in step S40 is referred to as "highest priority information item A". Next, the video control portion 14 determines whether or not the layout selection with respect to the setting status of the display portions is changed (step S41). When the layout selection with respect to the setting status of the display portions is changed, the video control portion 14 changes the setting status of the display portion stored in the priority storing portion 171 of the storing portion 17, and moves the process to the next step S43. On the other hand, when the layout selection with respect to the setting status of the display portions is not changed, the video control portion 14 moves the process to the next step S43 without performing any operation.

In the step S43, the video control portion 14 determines whether or not the layout selection of the first display portion 3 is set to the single display layout, referring to the setting status of the display portion stored in the priority storing portion 171. The video control portion 14 moves the process to the next step S44, when the layout selection of the first display portion 3 is set to the single display layout, and moves the process to the next step S47, when the layout selection of the first display portion 3 is not set to the single display layout.

In step S44, the video control portion 14 displays the highest priority information item A that is searched in the step S40 in the single display layout in the first display portion 3. Next, the video control portion 14 changes display information whose priority is a threshold or less of the display information whose display flag is "ON" in the display information list so as to be displayed in a simple manner (step S45). Then, the video control portion 14 displays the display information items other than the highest priority information item A whose display flag is "ON" in the display information list in a plural display layout in the second display portion 9 (step S46) and ends the process according to the flowchart.

On the other hand, in step S47, the video control portion 14 displays the highest priority information item A that is searched in the step S40 in the single display layout in the second display portion 9. The video control portion 14 changes display information whose priority is a threshold or less of the display information whose display flag is "ON" in the display information list so as to be displayed in a simple manner (step S48). Then, the video control portion 14 displays the display information items other than the highest priority information item A whose display flag is "ON" in the display information list in a plural display layout in the first display portion 3 (step S49) and ends the process according to the flowchart.

When a plurality of highest priority information items A are searched in the step S40, these display information items may be displayed in a plural display layout exclusively in the display portion that is set to the single display layout. In this case, when the same priority is given, as display information "TV image" and "TV operation" in FIGS. 21A and 21B, even if they have the highest priority, they are always displayed in the same display portion. Therefore, if the same priority is given to display information items that would cause a problem if they were displayed separately in the display portions, then they can be displayed in an appropriate layout without causing a problem.

Display information having a certain priority or higher may be always displayed exclusively in the first display portion 3. In this case, other display information items are displayed in a plural display layout in the second display portion 9. For example, a high priority may be given to display information having high emergency, and if it is configured such that this display information is always displayed exclusively in the first display portion 3 when it is received, the user of the portable information terminal device 1*d* can be alarmed by the information having high emergency.

Thus, according to the portable information terminal device of the third embodiment, when display information is requested to be added, the display layout with respect to a plurality of display portions is switched automatically in accordance with the priority, and a plurality of information items can be displayed in an appropriate layout that is easy to grasp to the user.

While the invention has been described in detail, the foregoing description is in all aspects illustrative and not restrictive. It is understood that numerous other modifications and variations can be devised without departing from the scope of the invention.

What is claimed is:

1. A portable information terminal device for receiving and displaying a plurality of information items, comprising:
   a receiving portion for receiving the plurality of information items,
   a first display portion for displaying at least one received information item using its display screen, a second display portion for displaying at least one received information item using a display screen different from the display screen of the first display portion, a video control portion for setting a layout in which the information items are displayed in the first display portion and the second display portion, based on a predetermined condition by which the information items received by the receiving portion are allocated to the first display portion or the second display portion, and a display state determining portion for determining whether the first display portion and the second display portion are in a first state in which the display screen of the first display portion and the display screen of the second display portion are visible at the same time from the same direction, or are in a second state in which only the display screen of the first display portion is visible from that direction, wherein a predetermined operation can change between the first state and the second state, and the video control portion performs setting in such a manner that:

when the display state determining portion determines that the first display portion and the second display portion are in the first state, a layout is set in which the information items received by the receiving portion are allocated to and displayed in the first display portion and the second display portion, based on the predetermined condition, and when the display state determining portion determines that the first display portion and the second display portion are in the second state, a layout is set in which all of the information items received by the receiving portion are displayed in the first display portion.

2. The portable information terminal device according to claim 1, wherein the video control portion performs setting in such a manner that:

when a single information item is allocated to either one of the first display portion and the second display portion, a single display layout is set in which only the information item is displayed exclusively on the entire display screen of the either one of the first display portion and the second display portion, and when a plurality of information items are allocated to either one of the first display portion and the second display portion, a plural display layout is set in which the information items are displayed by sharing the display screen of the either one of the first display portion and the second display portion.

3. The portable information terminal device according to claim 1, wherein the display screen of the first display portion is provided on a surface of a housing in the first state and the second state, the display screen of the second display portion is provided on the surface of the housing in the first state and is provided facing a back face side of the housing by closing a support member for supporting the display screen to the back face side of the housing in the second state.

4. The portable information terminal device according to claim 1, wherein the display screen of the first display portion is provided on a surface of a housing in the first state and the second state, the display screen of the second display portion is provided on the surface of the housing in the first state and is provided facing a back face side of the housing by turning over a support member for supporting the display screen about a predetermined rotation shaft and then moving the support member to the back face side of the housing in the second state.

5. The portable information terminal device according to claim 1, further comprising a storing portion for storing a display information list describing an instruction to allocate the information items that can be received by the receiving portion to the first display portion or the second display portion for each information item as the predetermined condition, wherein the video control portion sets a layout in which the information items received by the receiving portion are allocated to and displayed in the first display portion and the second display portion, based on the instruction described in the display information list stored in the storing portion, when the display state determining portion determines that the first display portion and the second display portion are in the first state.

6. The portable information terminal device according to claim 1, wherein the information items received by the receiving portion include at least broadcasting data including at least one of video signals, audio signals, and text information, the portable information terminal device further comprising an input/output control portion for outputting the video signals and the text information from the broadcasting data received by the receiving portion to the video control portion, wherein the video control portion sets a layout in which at least the video signals and the text information that are output from the input/output control portion are displayed in the first display portion and the second display portion, based on the predetermined condition.

7. The portable information terminal device according to claim 1, wherein the information items received by the receiving portion include at least broadcasting data including at least one of video signals of MPEG format, audio signals, and text information of, when the receiving portion has received the broadcasting data, a transport stream representing the broadcasting data is output, the portable information terminal device further comprising an input/output control portion for outputting video data and audio data by performing transport decoding and video/audio decoding with respect to the transport stream that is output from the receiving portion, wherein the video control portion sets a layout in which at least the video data that is output from the input/output control portion is displayed in the first display portion and the second display portion, based on the predetermined condition.

8. The portable information terminal device according to claim 1, wherein the first display portion and the second display portion are configured by different display systems from each other.

9. The portable information terminal device according to claim 1, wherein the first display portion and the second display portion are configured by a display system selected from the group consisting of LCD (liquid crystal display), organic EL (electroluminescent) and electric paper, and by different display systems from each other.

* * * * *